(12) United States Patent
Naito

(10) Patent No.: US 6,462,735 B2
(45) Date of Patent: *Oct. 8, 2002

(54) DISPLAY DEVICE, GAMMA CORRECTION METHOD, AND ELECTRONIC EQUIPMENT

(75) Inventor: Keijiro Naito, Matsumoto (JP)

(73) Assignee: Seiko Epson Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/347,521

(22) Filed: Jul. 6, 1999

(65) Prior Publication Data
US 2002/0126106 A1 Sep. 12, 2002

(30) Foreign Application Priority Data
Jul. 6, 1998 (JP) .......................... 10-205825

(51) Int. Cl.[7] ............................... G09G 5/00
(52) U.S. Cl. ................ 345/204; 345/87; 345/63; 345/89; 348/674; 382/274; 382/167
(58) Field of Search ............... 345/204, 87–88, 345/63, 89, 150; 348/674–676, 750–751; 358/518–519; 382/167, 274; 353/81

(56) References Cited

U.S. PATENT DOCUMENTS 5,546,101 A * 8/1996 Sugawara ................... 345/63
5,909,944 A * 6/1999 Yajima et al. ............... 353/81
5,933,199 A * 8/1999 Yoon .......................... 348/674
6,160,532 A * 12/2000 Kaburagi et al. ........... 345/87

OTHER PUBLICATIONS

Ghausi, Mohammed S. "Electronic Devices and Circuits", CBS College Publishing, pp. 402–403, 1985.*

U.S. patent application No. 09/142,659 (w/Patent Abstract of JP08–227283A), Matsueda, filed Sep. 1998.

* cited by examiner

Primary Examiner—Richard Hjerpe
Assistant Examiner—Francis Nguyen
(74) Attorney, Agent, or Firm—Oliff & Berridge, PLC

(57) ABSTRACT

A display device in which brightness and contrast in an electro-optical device are improved, and gain adjustment and brightness adjustment are not necessary. The present invention provides a device which drives a liquid crystal device in which light transmittance ratio changes based on applied voltage. Furthermore, a digital picture signal is gamma-corrected in a digital gamma correction circuit, and subsequently converted into an analog signal in a D/A conversion block and supplied to the liquid crystal device. The digital gamma correction circuit converts an 8-bit digital picture signal into a 10-bit digital picture signal based on gamma correction characteristics predetermined by applied voltage-transmittance characteristics inherent in the liquid crystal device in the entire transmittance range of 0% and 100%.

17 Claims, 15 Drawing Sheets

DISPLAY DEVICE, GAMMA CORRECTION METHOD, AND ELECTRONIC EQUIPMENT

BACKGROUND OF THE INVENTION

1. Field of Invention

The present invention relates to a display device having an electro-optical device such as a liquid crystal device, or the like, in which transmittance (reflectance) varies with applied voltage.

2. Description of Related Art

Electronic equipment incorporating such a display device includes, for example, a projection display device in which three liquid crystal devices (LCD) for performing optical modulation of each chromatic light of red (R), green (G), and blue (B) are respectively used as a light valve (L/V). FIG. 16 shows applied voltage-transmittance (V-T) characteristics inherent in each of the liquid crystal devices for performing optical modulation of each chromatic light of R, G, and B (in which twisted nematic liquid crystal is used). In FIG. 16, although the range for applying voltage to the liquid crystal can be set between 0V and 6V, both the white level region in which transmittance is approximately 100% and the black level region in which transmittance is approximately 0% are saturated. Accordingly, such an arrangement is provided so that amplitude of the voltage for application to the liquid crystal is limited to a level of approximately 3.8V so as to prevent the white level region and the black level region from becoming saturated. That is, in this arrangement, direct current bias (DC bias) of a picture signal is adjusted in such a manner that voltage which does not produce saturation in the regions of the white level and black level is applied to each liquid crystal. This is referred to as brightness adjustment.

In FIG. 17, the V-T characteristics of the chromatic lights R, G, and B present a mutually different inclination, and there is shown variations in the voltage which produces saturation in the regions of the white level and the black level among the colors. In order to reduce the variations, a gain of a picture signal is adjusted, which is referred to as gain adjustment. Furthermore, in the liquid crystal device (LCD), transmittance is determined by the ratio of light amounts which are transmitted through a liquid crystal panel having liquid crystal between a pair of substrates and through a polarizer disposed on at least one side of the liquid crystal panel. Reflectance is substituted for transmittance in a reflection-type electro-optic device.

FIG. 17 shows a relationship of a gray-scale value and transmittance of a digital input signal after brightness adjustment and gain adjustment. As shown in FIG. 17, in the black level region, there is a slight change in transmittance with respect to changes of gray-scale values, so that satisfactory resolution cannot be obtained.

In order to obtain ideal gamma characteristics (ideal γ characteristics) as shown in FIG. 17, gamma correction characteristics shown in FIG. 18 are used for correcting a digital picture signal. When the liquid crystal device is driven based on the signal subjected to gamma correction performed according to the characteristics shown in FIG. 18, characteristics close to the ideal gamma characteristics in FIG. 17 can be obtained as shown in FIG. 19. Thus, conventionally, in order to obtain gamma correction characteristics, it is essential to perform brightness adjustment and gain adjustment in advance.

Consequently, a display device incorporating a conventional liquid crystal device requires a circuit arrangement as shown in FIG. 15. In FIG. 15, a picture signal is converted into a digital picture signal by an analog-to-digital (A/D) converter 10 to perform signal-processing including gamma correction and digital-to-analog (D/A) conversion by a picture signal processing circuit 20. The picture signal processing circuit 20 includes ASIC 22 having a gamma correction circuit and a D/A converter 24. An amplifier 30 performs gain adjustment of the analog picture signal, and then a bias adjustment circuit 40 performs DC bias adjustment (brightness adjustment) of the signal so as to send it to a liquid crystal device 50.

A CPU 60 shown in FIG. 15 serves as a controller of the display device. The CPU 60 controls gamma correction as follows. First, the V-T characteristics which are inherent in the liquid crystal device 50 shown in FIG. 16 are actually measured. Next, the CPU 60 controls gain adjustment performed by the amplifier 30 through a gain controller 80, and also controls DC bias performed by the bias adjustment circuit 40 through a brightness controller 90 to obtain the V-T characteristics shown in FIG. 17. An EEPROM 70 stores the obtained the V-T characteristics, the gain adjustment data, and the brightness adjustment data, from which the V-T characteristics are obtained. Then, the CPU 60 calculates gamma correction characteristics shown in FIG. 18, based on the V-T characteristics stored in the EEPROM 70, which is shown in FIG. 17, and predetermined ideal gamma characteristics, and sets the gamma correction characteristics, for example, as table information, in a gamma correction circuit inside the ASIC 22. Accordingly, in order to obtain the V-T characteristics as shown in FIG. 19 in the liquid crystal device 50, such an arrangement is provided so that a picture signal input from the A/D converter 10 is corrected according to table information so as to perform gain adjustment and brightness adjustment by the amplifier 30 and the bias adjustment circuit 40 according to the gain adjustment data and the brightness adjustment data stored in the EEPROM 70.

Therefore, it is essential for the conventional display device described above to perform such gain adjustment and brightness adjustment in advance before determining gamma correction characteristics, as shown in FIG. 18, in the gamma correction circuit inside the ASIC 22. Such gain adjustment and brightness adjustments are extremely complicated since they vary among liquid crystal devices. In addition, precise adjustment is necessary, since misadjustment directly affects image quality. More specifically, since a projection display device which synthesizes chromatic lights modulated by a plurality of liquid crystal devices for projection requires mutual adjustment between the liquid crystal devices, performing gamma correction requires very complicated work.

In addition, since the conventional display device performs brightness adjustment, the transmittance range of the liquid crystal device is narrowed, leading to reduction in contrast and darkening of the display screen. In other words, the conventional brightness adjustment and gain adjustment result in the transmittance, for example, of 3% for the black level and of 97% for the white level in the liquid crystal device. This allows contrast reduction and increased darkening of the screen compared with a device which uses the whole transmittance range of 0 to 100%, as described above.

SUMMARY OF THE INVENTION

Accordingly, it is an object of the present invention to provide a display device and electronic equipment which can yield the brightness and contrast of an electro-optical device as close to the best characteristics that the device can offer.

It is another object of the present invention to provide a display device and electronic equipment in which gain adjustment and brightness adjustment are not necessary.

It is another object of the present invention to provide a display device and electronic equipment which can reproduce ideal input-output characteristics in terms of gamma correction and color temperature.

According to the present invention, there is provided a display device including an electro-optical device in which transmittance changes according to voltage applied to an electro-optical material, a digital gamma correction circuit for performing gamma correction of a digital picture signal, a digital-to-analog conversion circuit for converting the digital picture signal corrected by the digital gamma correction circuit into an analog picture signal, and an amplifier for amplifying the analog picture signal, in which voltage is applied to an electro-optical material based on the output of the amplifier, and in which the digital gamma correction circuit converts the digital picture signal of n bits into a digital picture signal of N bits ($N \geq n+2$) based on gamma correction characteristics predetermined by applied voltage-transmittance characteristics inherent in the electro-optical device.

In addition, according to the present invention, there is provided a gamma correction method for correcting applied voltage-transmittance characteristics inherent in an electro-optical device in which light transmittance changes depending on voltage being applied to the electro-optical material, in which gamma correction is performed on a digital picture signal, the gamma-corrected digital picture signal is converted into an analog picture signal that is amplified, voltage is applied to the electro-optical material based on the amplified analog picture signal, and when the gamma correction is performed, the digital picture signal of n bits is converted into a digital picture signal of N bits ($N \geq n+2$) based on a gamma correction characteristics predetermined according to applied voltage-transmittance characteristics inherent in the electro-optical device.

In applied voltage-transmittance characteristics inherent in the electro-optical device, in the case of a normally black mode, there is a saturated situation (see FIG. 3) in which changes in transmittance are small with respect to changes of applied voltage on the black level side of transmittance 0%. Consequently, gamma correction characteristics for compensating for this show a sharp curve on the black level side and a great deal of gray-scale data is used for correcting in the region (see FIG. 4). In the case of a normally white mode, in contrast, since the white level side of transmittance 100% becomes saturated, a great deal of gray-scale data is used for correction in the region. In other words, in either display modes, V-T characteristics change less in the proximity of transmittance 0% or 100%. As a result, in order to change a display gray scale at an equal level by performing gamma correction in the region, voltage change for a picture signal in the region is set to be small so as to allow transmittance to be more linearly changed. It is necessary for making the voltage change for the picture signal small to use more gray-scale data of the digital picture signal in the region.

As a result, the gray-scale data amount assigned to the region including halftones of luminance 10% to 90% is reduced. In fact, when the number of bits for inputting to the digital gamma correction circuit is set as n bits, for example 8 bits, it is found that even though the number of bits for outputting is set to n or n+1, sufficient gray-scale data cannot be assigned to the region including halftones originally having data of about 200 levels of gray scale with 10% to 90% of luminance (see the case of 9-bit outputting in FIG. 4). The present invention solves the above problem by making the number of outputting bits n+2 bits or more (see the case of 10-bit outputting in FIG. 4), in the digital gamma correction circuit.

As described above, the present invention permits ensuring of the number of bits for a digital picture signal assigned to the region of halftones, even in the case of using a region with less change ratio in applied voltage-transmittance characteristics inherent in the electro-optical device. Thus, the present invention permits the range for using applied voltage-transmittance characteristics inherent in the electro-optical device to be enlarged. This can lead to provision of an image with satisfactory brightness and high contrast.

Accordingly, the present invention allows gamma correction characteristics to be determined by applied voltage-transmittance characteristics inherent in the electro-optical device in the entire transmittance range of 0% to 100%. Consequently, this requires neither the conventional brightness adjustment nor gain adjustment.

In order to make the conventional brightness adjustment and gain adjustment unnecessary, the digital gamma correction circuit performs at least one (preferably both) of bias adjustment and gain adjustment of a picture signal to perform conversion of a digital picture signal. This allows the amplifier to have no variable resistor being bias adjustment means and gain adjustment means.

Moreover, in the present invention, the amplifier outputs a picture signal to reverse the polarity of voltage applied to the electro-optical material in a specified cycle. The digital gamma correction circuit outputs the digital picture signal, and a digital polarity inverting circuit digitally reverses the polarity of the digital picture signal in the specified cycle. In addition, the digital-to-analog converter outputs the analog picture signal, and an analog polarity inverting circuit reverses the polarity of the analog picture signal in an analog form in the specified cycle.

The present invention permits voltage of a first polarity and a second polarity to be applied to an electro-optical material in a specified cycle. This allows arrangement of the digital polarity inverting circuit for digitally inverting the polarity of the digital picture signal output from the digital gamma correction circuit in the specified cycle. In addition, this also allows arrangement of the analog polarity inverting circuit for inverting the polarity of the analog picture signal output from the digital-analog converter in an analog form in each specified cycle.

When such a polarity inversion is performed, it is preferable that voltage output from the amplifier in achieving either one of the maximum transmittance and the minimum transmittance by the electro-optical device be substantially equal in both voltage applications using a first polarity and a second polarity. The equal voltage is a central potential of an amplitude of voltage from the amplifier. In this state, when the range for using applied voltage-transmittance characteristics inherent in an electro-optical device is increased, as described above, the amplitude of output from the amplifier is also increased. However, using the central potential of the amplitude of output from the amplifier, for example, as a potential for the white level mode in both cases of a first polarity and a second polarity permits voltage amplitude to be minimal.

Furthermore, the electronic equipment of the present invention has a plurality of electro-optical devices in which light transmittance changes based on voltage applied to an electro-optical material, and lights modulated by a plurality of the electro-optical devices are synthesized for display, in which each of the electro-optical devices has a digital gamma correction circuit for executing gamma correction of a digital picture signal, a digital-to-analog conversion circuit for converting the digital picture signal corrected by the digital gamma correction circuit into an analog picture signal, and an amplifier for amplifying the analog picture signal, in which voltage is applied to the electro-optical material based on output from the amplifier, and in which the digital gamma correction circuit converts the digital picture signal of n bits into a digital picture signal of N bits (N≧n+2) based on gamma correction characteristics predetermined by applied voltage-transmittance characteristics inherent in the electro-optical device.

The present invention allows the range for using applied voltage-transmittance characteristics inherent in the electro-optical device to be increased. This allows each of the formed images to be brighter and be a high contrast image by a plurality of the electro-optical device. Therefore, a displayed image of a projection display device becomes brighter and more high contrast, since this type synthesizes chromatic lights of R (red), G (green), and B (blue) modulated by a plurality of the electro-optical devices and forms an image made of the synthesized light on the screen for display.

When the chromatic lights modulated by the respective electro-optical device are synthesized, in the case where input gray-scale data are mutually equal, it is necessary for the transmittance of V-T characteristics of the electro-optical device to be in a certain ratio relationship (in which the transmittance with respect to gray-scale data needs to be equal, or even if gray-scale levels change, transmittance needs to be equal), otherwise chromatic balance of the synthesized image is lost in response to gray-scale changes. In the present invention, however, the digital gamma correction circuit converts into a digital picture signal in such a manner that the gray-scale data and the curve of transmittance characteristics in the electro-optical device corresponding to the data are substantially equal or similar between a plurality of the electro-optical devices, thereby, achieving a stabilization of chromatic balance regardless of gray scale levels.

The digital gamma correction circuit performs at least one of bias adjustment and gain adjustment of a picture signal applied to the electro-optical material to convert the picture signal into a digital picture signal. This permits the amplifier to have no variable resistor being bias adjustment means and gain adjustment means.

A plurality of the electro-optical devices respectively modulate mutually different chromatic lights and the digital gamma correction circuit which corresponds to each of the plurality of electro-optical devices performs correction of color temperature which is presented by a synthesized light made of chromatic lights modulated by the respective electro-optical devices. More particularly, the digital gamma correction circuit which corresponds to each of the plurality of electro-optical devices allows a plurality of the electro-optical devices to mutually adjust slopes of the transmittance characteristic curves of the electro-optical devices with respect to the gray-scale data so as to perform color temperature correction. In other words, mutual adjustment of the inclination of the V-T characteristic curve of each electro-optical device between the chromatic lights permits differentiation in the color temperatures of synthesized light, so that the digital gamma correction circuit of the present invention can achieve correction that includes the color temperature correction of displayed colors.

In the present invention, a picture signal is equivalently regarded as an image signal, and transmittance ratio is optical reflectance in a reflection type electro-optical device.

DETAILED DESCRIPTION OF PREFERRED EMBODIMENTS

Figure 1:
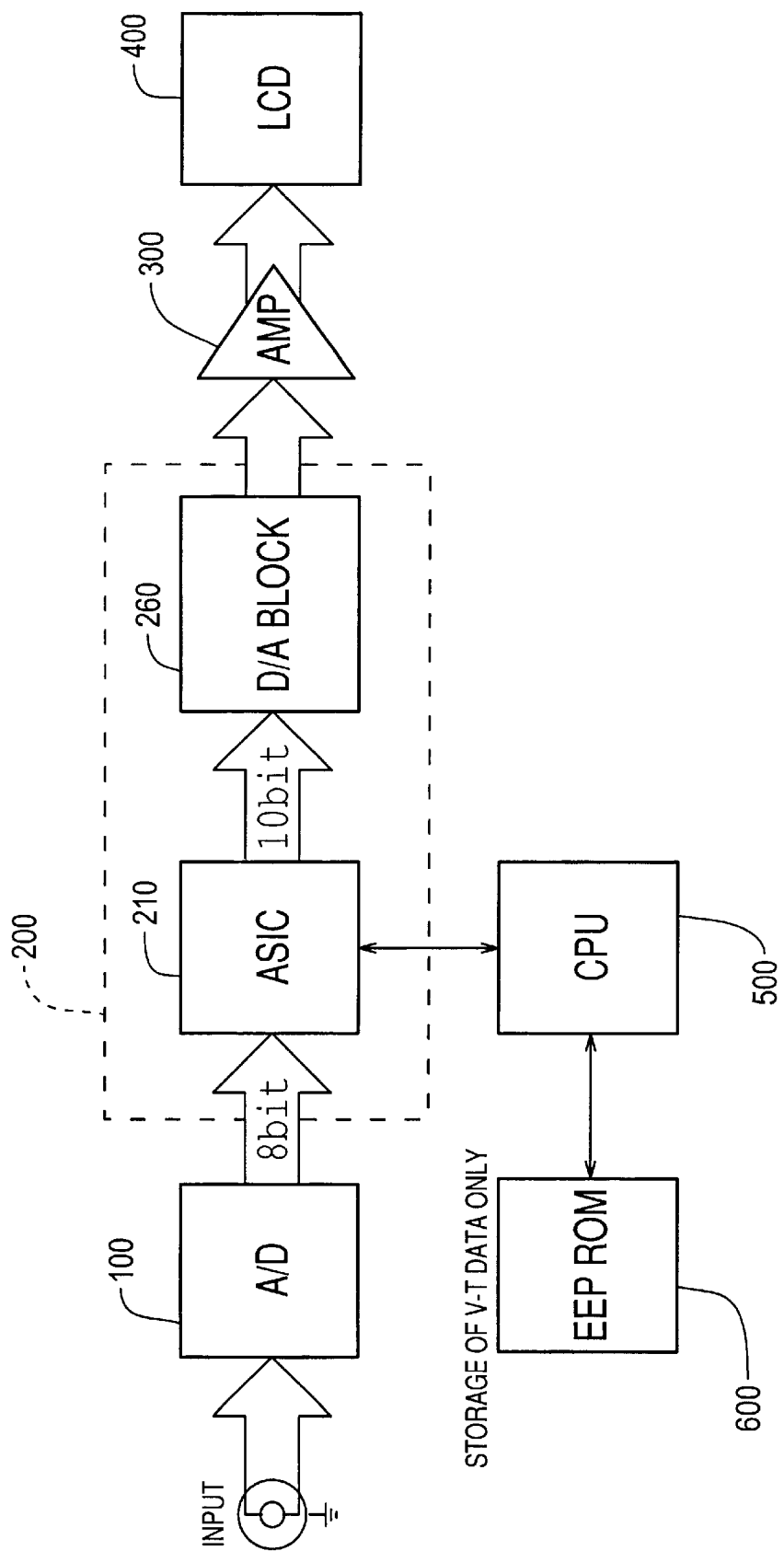
FIG. 1 is an exemplary block diagram of a liquid crystal display device employed as an embodiment of an electro-optical device in accordance with the present invention.

A description will be given of an embodiment of the present invention referring to the drawings.

Figure 2:
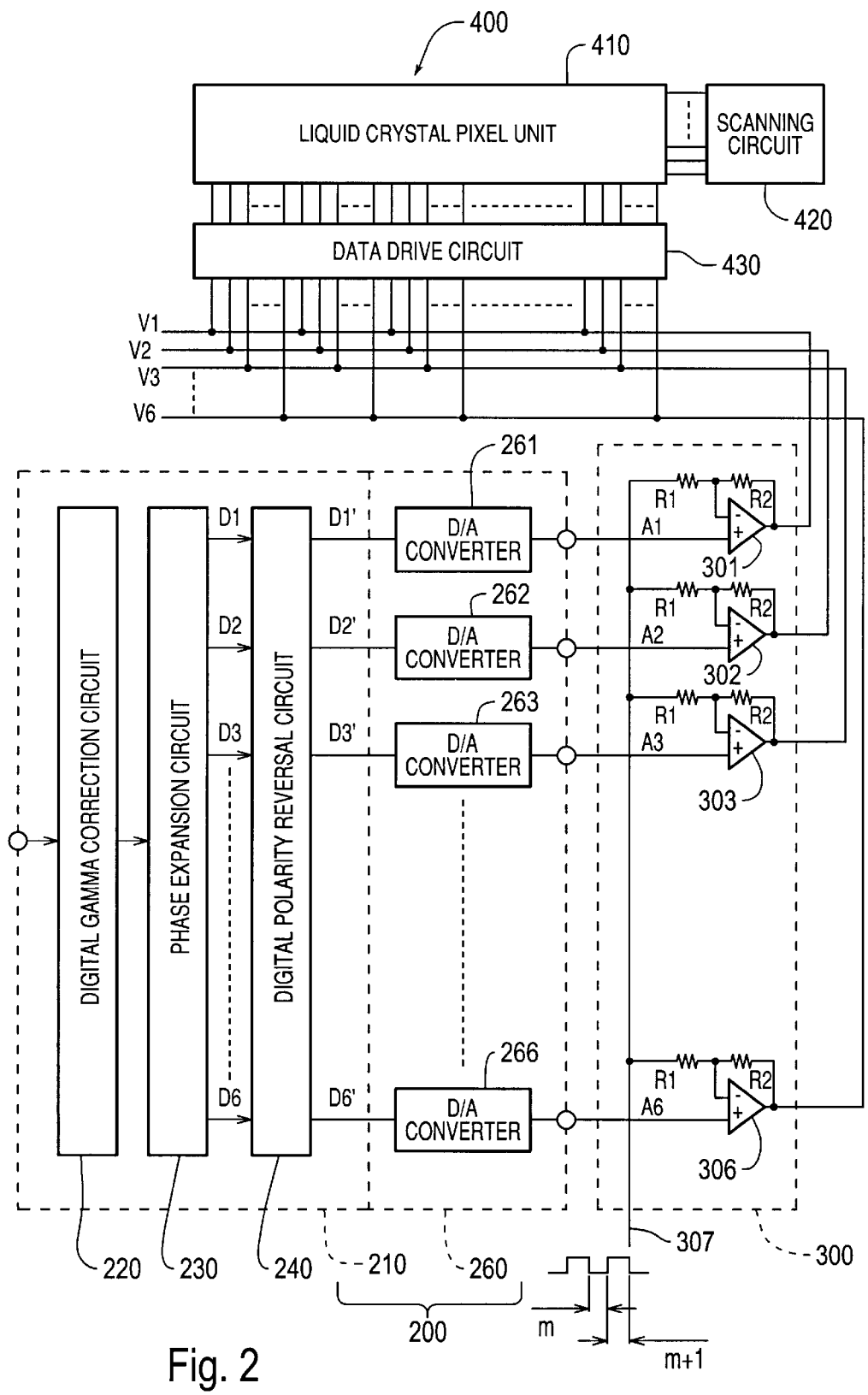
FIG. 2 is an exemplary block diagram illustrating details of a signal-processing circuit, an amplifying block, and the liquid crystal device shown in FIG. 1.

FIG. 1 is an exemplary block diagram of a liquid crystal display device used as an example of a display device incorporating an electro-optical device. FIG. 2 is a block diagram illustrating the details of a part of the display device shown in FIG. 1.

The liquid crystal device shown in FIG. 1 has an analog-to-digital (A/D) converter 100 for converting an input analog picture signal into an 8-bit digital picture signal, a signal-processing circuit 200, an amplifying block 300, and a liquid crystal device 400 as an example of an electro-optical device. The signal-processing circuit 200 has ASIC 210 and a digital-to-analog (D/A) conversion block 260. Although a CPU 500 in the liquid crystal display device controls the liquid crystal display device overall, the CPU 500 can additionally serve to determine gamma correction characteristics of a digital gamma correction circuit 220, which is mentioned below, located in the ASIC 210, based on data stored in a memory unit, such as a non-volatile EEPROM 600.

As shown in FIG. 2, the ASIC 210 includes a digital gamma correction circuit 220 for performing gamma correction on a digital picture signal which is output from the A/D converter 100, a phase expansion circuit (serial-to-parallel conversion circuit) 230 for performing parallel conversion of the gamma-corrected digital picture signal into six parallel digital picture signals D1 to D6, and a digital polarity inverting circuit 240 for performing digital polarity inversion processing onto the digital picture signal which is transmitted in parallel. In the D/A conversion block 260 are disposed first through sixth D/A converters 261 through 266 for converting the digital picture signals D1 through D6 into analog picture signals. In the amplifying block 300 are disposed first through sixth operational amplifiers 301 through 306 for every parallel picture signal.

A bias signal 307, for polarity inversion, is input to the negative terminals of the first through sixth operational amplifiers 301 through 306, and each force line of the first through sixth D/A converters 261 through 266 is connected to the positive terminals of the same.

Resistors R1 and R2 for setting gain are connected to each of the first through sixth operational amplifiers 301 through 306. When input to the positive terminal of the operational amplifier is represented by Vin and input to the negative terminal of the same is represented by Vbias, output Vout from the operational amplifier is described in equation (1), as shown below:

$$Vout = (1 + R2/R1) \cdot Vin + (R2/R1) \cdot Vbias \quad (1)$$

The first through sixth operational amplifiers 301 through 306 allow voltage of an analog picture signal to be cyclically polarity-inverted based on a bias signal 307 for polarity inversion.

A liquid crystal device 400 comprises a liquid crystal pixel section 410, a scanning circuit 420 for driving the liquid crystal device 400 to display, and a data driving circuit 430. The liquid crystal pixel section 410 is formed by inserting twisted nematic type liquid crystal, which is an electro-optical material, between a pair of substrates. One of the substrates is, for example, an active matrix substrate, on which are formed a plurality of scanning lines and a plurality of data lines. Furthermore, near each point of the intersections of those lines are formed a switching element such as a transistor, continuity of which is controlled by the scanning lines, and a pixel electrode for applying a picture signal from the data line through the conducted switching element. In this arrangement, application of voltage to a pixel electrode and a common electrode (which is formed on the above active matrix substrate or the other substrate which is opposing this) permits changes in an aligning direction of a liquid crystal molecule according to voltage, so that a light polarization axis is rotatably controlled according to the voltage applied to the pixel electrode of each pixel. This is referred to as optical modulation.

In the liquid crystal device, on one side or both sides of the pair of substrates is disposed a polarizing means such as a polarizer for transmitting only the light of a specified polarization axis. The light, the polarization axis of which is rotatably controlled after transmitting the liquid crystal, transmits through this polarizing means. The ratio of the amount of light which is transmitted through the polarizing means is light transmittance and the picture signal allows the light transmittance to change according to a gray scale level presented by the picture signal so as to display images.

Voltages V1 through V6 of picture signals output from the amplifiers 301 through 306 are supplied to the data driving circuit 430 in parallel, and are simultaneously supplied to the six data lines. The scanning lines are selected in sequence by the scanning circuit 420 and the picture signal voltage is applied to the pixel electrode from the data line through the switching element which is connected with the selected scanning line.

In the liquid crystal device 400, the scanning circuit 420 and the data driving circuit 430 may be formed on the periphery of the active matrix substrate comprising the liquid crystal pixel section 410. An example of a liquid crystal device 400 as an embodiment has been described herein, but it is also possible to dispose a plurality of such liquid crystal devices.

The projection display device employs three light valves for performing optical modulation of the above liquid crystal device in which individual optical modulation is performed onto the chromatic lights of red (R), green (G), and blue (B) to synthesize the three chromatic lights, and the synthesized light is projected. In this projection display device, a display device shown in FIG. 1, and a block shown in FIG. 2 are disposed for performing optical modulation of each chromatic light of red, green, and blue, and in which an A/D converter 100 performs an A/D conversion onto a picture signal of each chromatic light, the ASIC 210 performs gamma correction thereon, the D/A converter 260 performs a D/A conversion thereon, the amplifying block 300 generates an analog picture signal to drive each liquid crystal device 400 in response to that, so that optical modulation of each chromatic light is performed. The modulated three chromatic lights including red, green, and blue are then synthesized and projected so as to form a color image on the projecting surface.

Description of Operation of Digital Gamma Correction Circuit

A description will be given of gamma correction performed by a digital gamma correction circuit 220 shown in FIG. 1. The digital gamma correction circuit 220 performs gamma correction on an n-bit digital signal output from the A/D converter 100, for example, an 8-bit digital signal (256-level gray scale) based on memory information predetermined by applied voltage-transmittance characteristics (V-T characteristics) inherent in the liquid crystal device 400 within a transmittance range of 0% to 100% so as to convert it into N-bits (N≧n+2), for example, a 10-bit digital signal.

Figure 3:
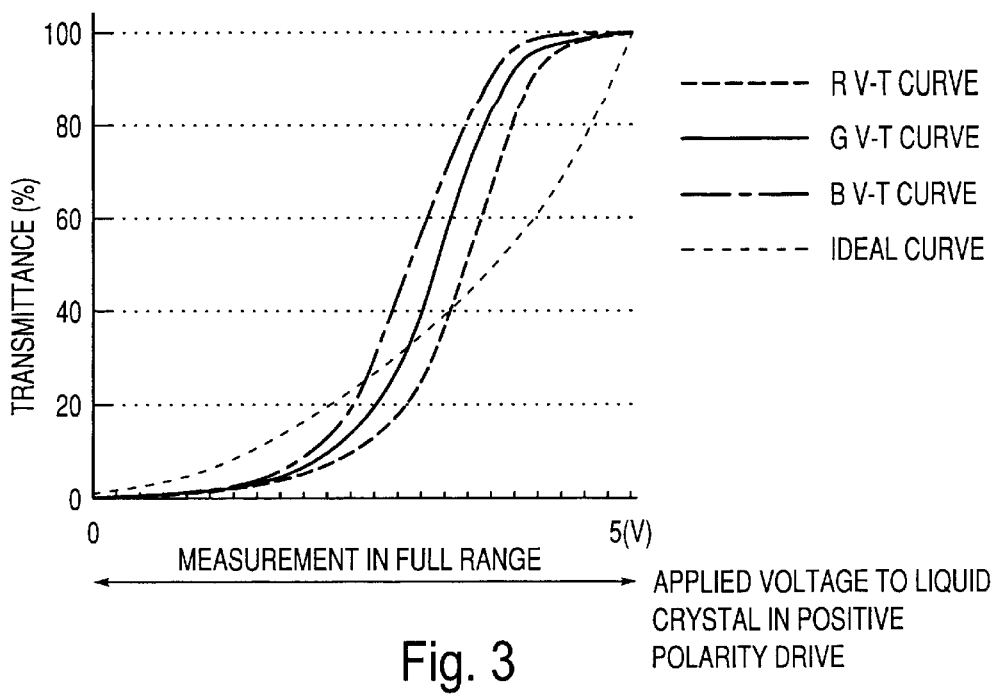
FIG. 3 is an exemplary chart indicating applied voltage-characteristic inherent in the liquid crystal device shown in FIG. 2.

FIG. 3 shows V-T characteristics inherent in the liquid crystal device 400. The V-T characteristics in FIG. 3 are V-T characteristics of the liquid crystal device in which twisted nematic type liquid crystal is used as liquid crystal and a pair of polarizers having a liquid crystal panel therebetween are set in a normally black mode. The horizontal axis of the graph shown in FIG. 3 indicates voltage (V) applied to liquid crystal in the case of driving by positive polarity, which is not voltage of a picture signal itself but voltage applied between a pixel electrode and a common electrode. The vertical axis indicates transmittance(%) of light transmitting through the liquid crystal device 400. In FIG. 3, there are shown V-T characteristic curves of the three liquid crystal devices 400, which respectively modulate each chromatic light of red (R), green (G), or blue (B) in the above described projection display device.

Figure 4:
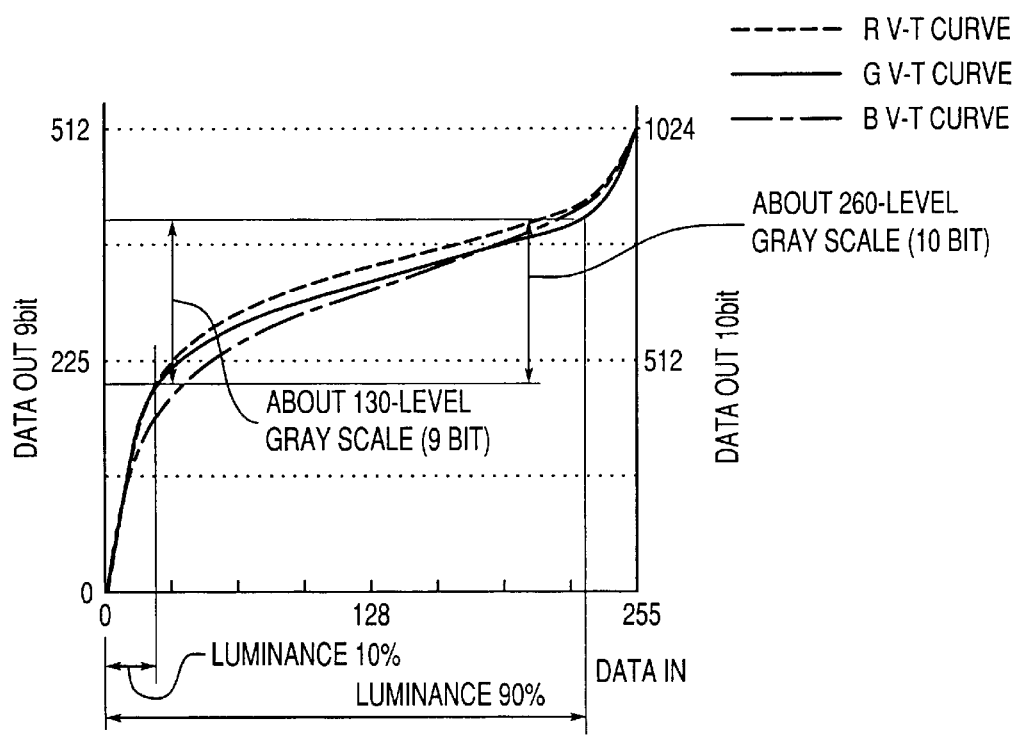
FIG. 4 is an exemplary chart indicating a relationship between gray scale values of a picture signal input to a digital gamma correction circuit shown in FIG. 2 and gray scale values of the picture signal obtained after gamma correction.
Figure 5:
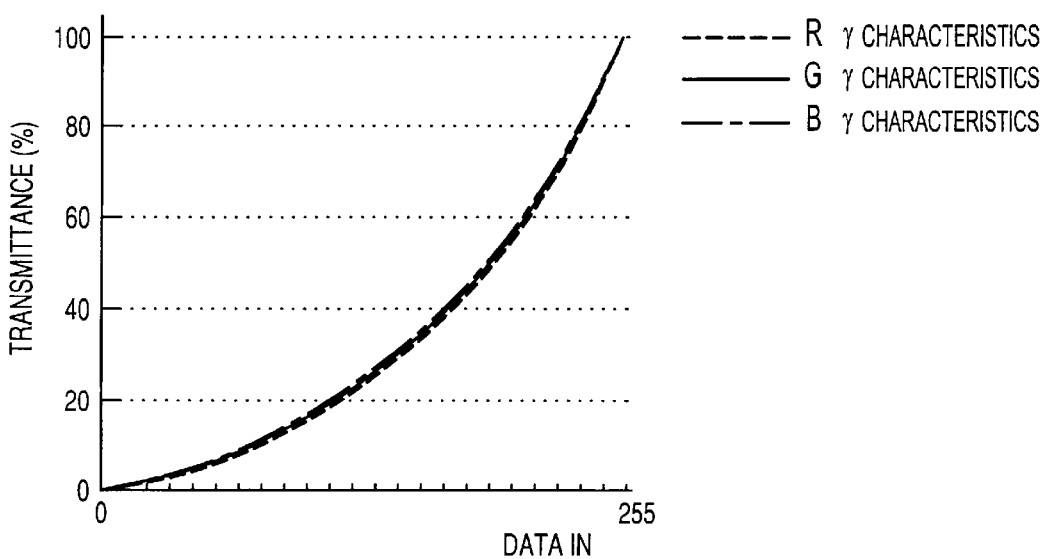
FIG. 5 is an exemplary chart indicating a relationship between gray scale values of a picture signal obtained after gamma correction performed according to the characteristics shown in FIG. 3 and transmittance ratios.

In FIG. 4, there is shown a relationship between output after gamma correction and an input picture signal in the digital gamma correction circuit 220 shown in FIG. 2, which is disposed in each of the liquid crystal devices 400 for respectively modulating red, green, and blue. The horizontal axis of a graph shown in FIG. 4 indicates input data (DATA IN) of 255-level gray scale represented by an 8-bit picture signal. The vertical axis indicates output data (DATA OUT) of a picture signal in a case where the data is input so as to output the data as a 9-bit picture signal (left axis) or a 10-bit picture signal (right axis) after gamma correction from the digital gamma correction circuit 220. FIG. 5 shows characteristics of the relationship between the input data (DATA IN) after gamma correction is performed according to the characteristics shown in FIG. 3, and transmittance of the three liquid crystal devices.

In FIG. 3, shows three curves: V-T characteristics (broken line) of the liquid crystal device for modulating a red (R) light, V-T characteristics (solid line) of the liquid crystal device for modulating a green (G) light, and V-T characteristics (dash-dot line) of the liquid crystal device for modulating a blue (B) light. In a manner similar to this, FIGS. 4 and 5 also respectively show characteristics of the digital gamma correction circuit 220 corresponding to each liquid crystal device for modulating each chromatic light of red (R), green (G), and blue (B), and in which red characteristics are indicated by a broken line, green ones by a solid line, and blue ones by a dash-dot line.

In FIG. 3, the V-T characteristics of the liquid crystal devices for modulating each chromatic light have mutually different transmittance characteristics between the colors, in which transmittance varies with the colors according to wave-transmittance characteristics, and production process of the liquid crystal devices varies with the colors. Common points among the V-T characteristics of those liquid crystal devices for modulating chromatic lights of red (R), green (G), or blue (B) are decreased changes in transmittance with respect to changes of applied voltage V and low resolutions in a black-level region with low transmittance.

An ideal curve (dotted line) shown in FIG. 3 indicates ideal V-T characteristics after gamma correction. In order to obtain the ideal V-T characteristics, the relationship between input(V) and output(Ix) in the digital gamma correction circuit 220 follows equation (2), as shown below:

$$\text{Output } (Ix) = \text{Input } (V)^\gamma \tag{2}$$

In the case of an NTSC signal, the value of γ is represented by γ=2.2, and in the case of output from a personal computer, it is represented by γ=2.2 to 2.8. In order to obtain those close to the ideal V-T characteristics, the digital gamma correction circuit 230 shown in FIG. 2 performs gamma correction compensating for V-T characteristics of each liquid crystal device onto the input data (DATA IN) according to gamma correction characteristics shown in FIG. 4 so as to convert it into output data (DATA OUT).

As shown in FIG. 5, in order to obtain gamma characteristics close to the ideal gamma curve shown in FIG. 3 in each liquid crystal device for modulating each chromatic light of R, G, or B, a digital picture signal input into the digital gamma correction circuit 220 shown in FIG. 2 is given gamma correction according to gamma correction characteristics shown in FIG. 4 so as to drive the liquid crystal device 400 based on the output.

FIG. 4 indicates a 9-bit output in the case of 512-level gray scale of output (DATA OUT) and a 10-bit output in the case of 1024-level gray scale of the same. In the digital gamma correction circuit 220 employed in the embodiment of the present invention, as described above, the 10-bit output, which is 2 bits more than an 8-bit picture signal input, is used, and the 9-bit output is shown as a comparative example.

The gamma correction characteristics shown in FIG. 4 compensate for the V-T characteristics over the entire transmittance range (0% to 100%) in the case of 5V voltage amplitude shown in FIG. 3. Thus, in both the cases of 9-bit output and 10-bit output, in order to compensate for the characteristics in the black level region in the luminance range of 0% to 10%, approximately 44% of the whole gray-scale levels are assigned to gray-scale levels for the black level region.

Into a region which includes halftone-display areas of luminance of 10% to 90%, only about 160-level gray scale is assigned in the case of 9-bit output. Converting the approximately 160-level gray scale into the number of colors, this is equivalent to display of about 4-million colors, depending on combinations of the number of gray-scale levels of the three chromatic lights. Consequently, in this case, it is impossible to display all of the 16.7-million colors which video data actually contain.

In contrast, in the case of 10-bit output, about 320-level gray scale, which is twice that of 9-bit output, can be assigned to a region including halftone-display areas of luminance of 10% to 90%. Similarly, converting the approximately 320-level gray scale into the number of colors, this is equivalent to about 327.68-million color displays, so that all the colors which video data actually contain may be sufficiently displayed. Accordingly, the embodiment of the present invention permits satisfactory maintaining of color reproduction in a display image.

Figure 15:
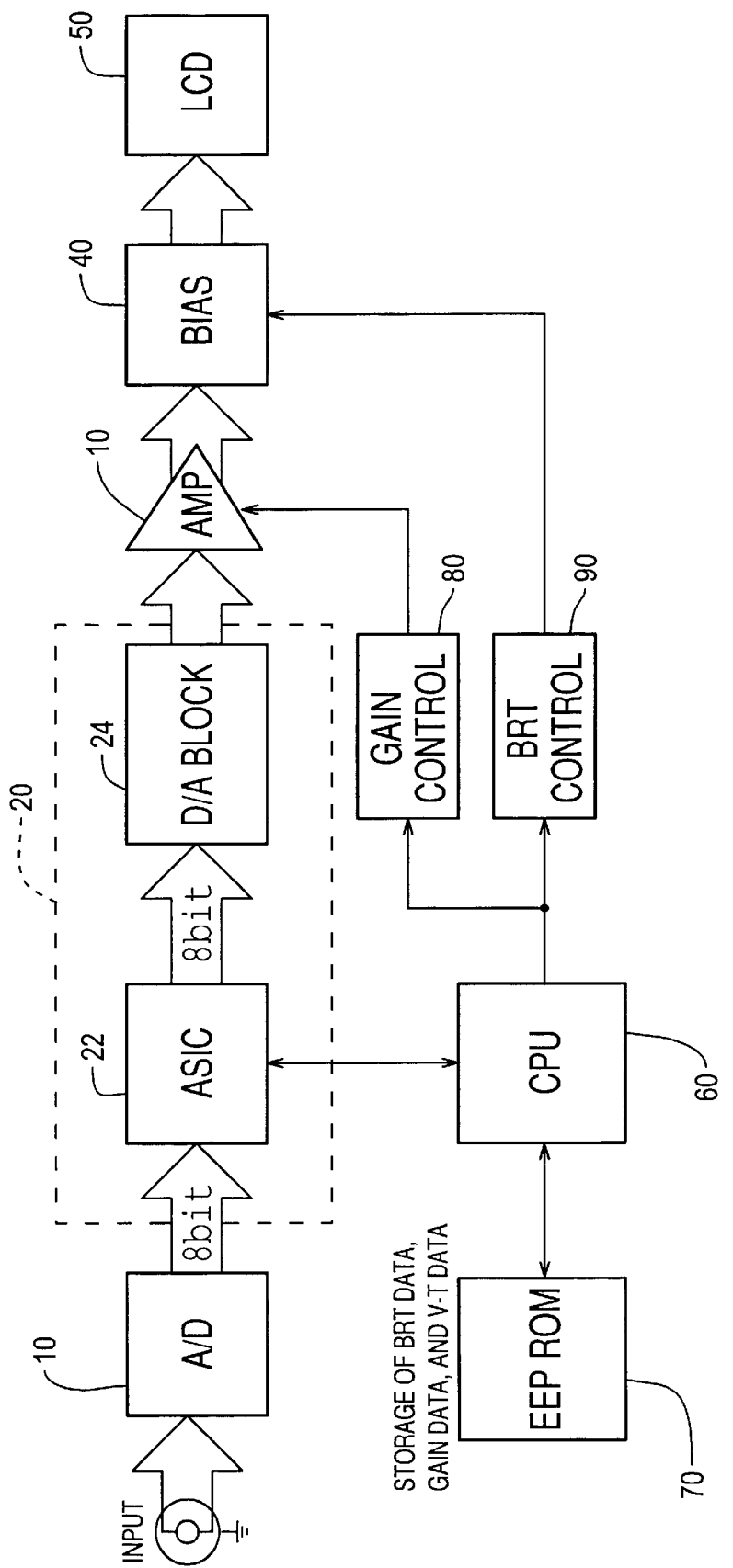
FIG. 15 is a block diagram of a conventional liquid crystal display device.
Figure 16:
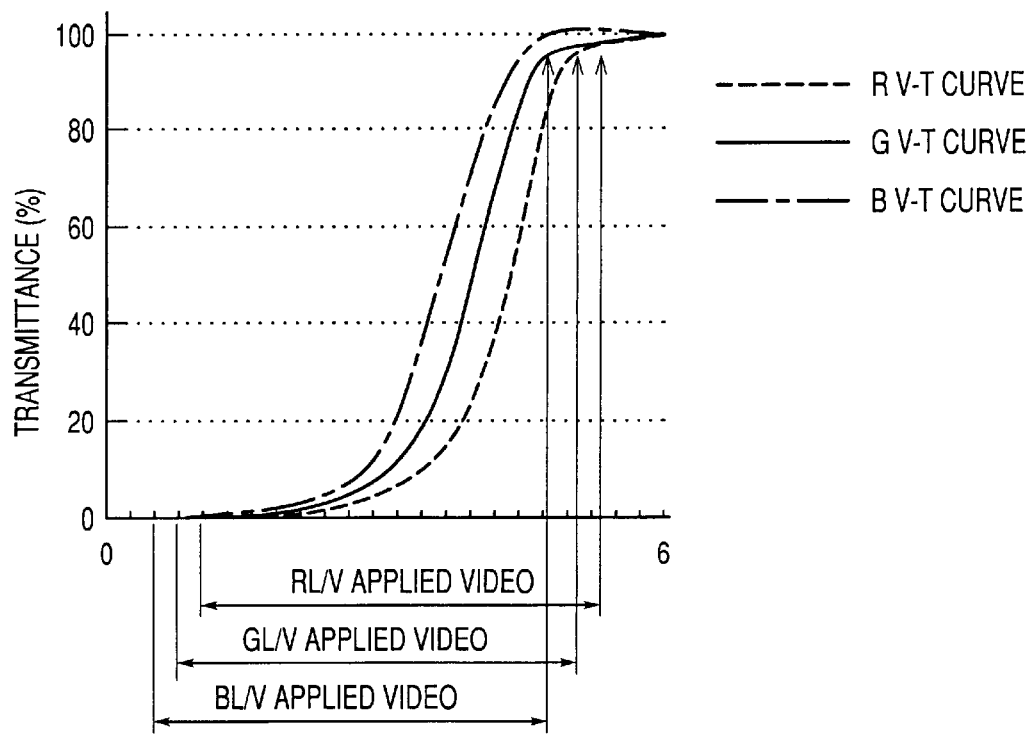
FIG. 16 is an exemplary chart indicating the relationship between applied voltage(V)-transmittance(T) inherent in the liquid crystal device (LCD) shown in FIG. 15.
Figure 17:
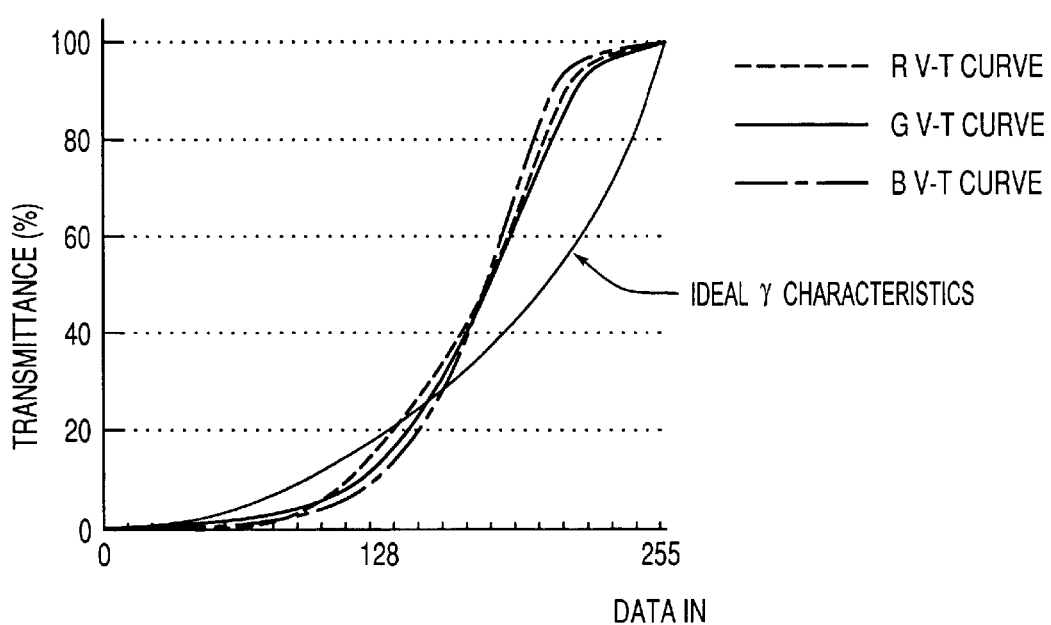
FIG. 17 is an exemplary chart indicating the relationship between gray scale values of a digital picture signal and transmittance ratios after brightness adjustment and gain adjustment in the liquid crystal device shown in FIG. 15.
Figure 18:
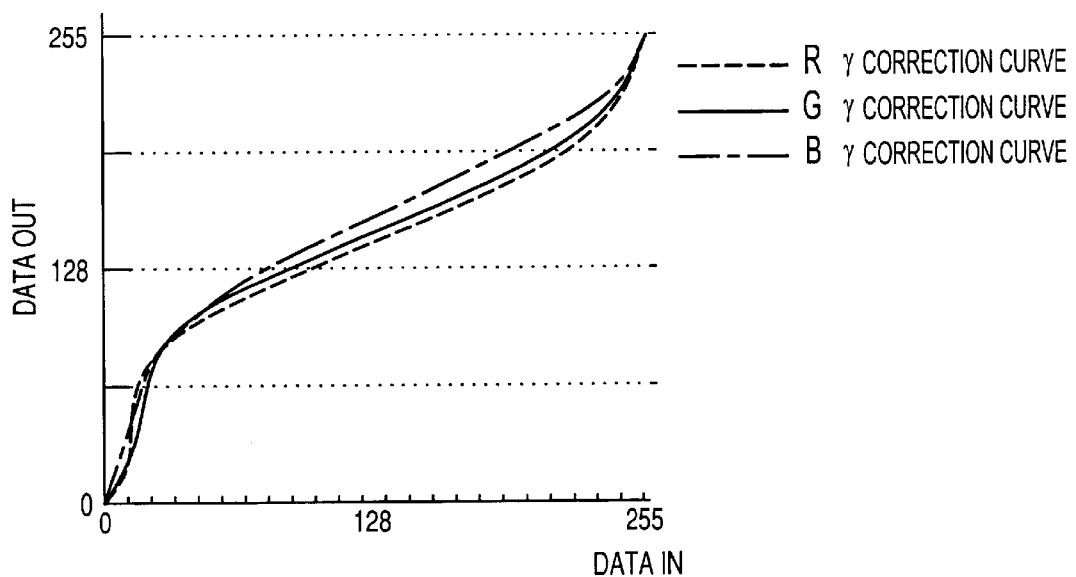
FIG. 18 is an exemplary chart indicating the relationship between gray scale values of the digital picture signal before gamma correction and the gamma-correction characteristics in the liquid crystal device in FIG. 15.
Figure 19:
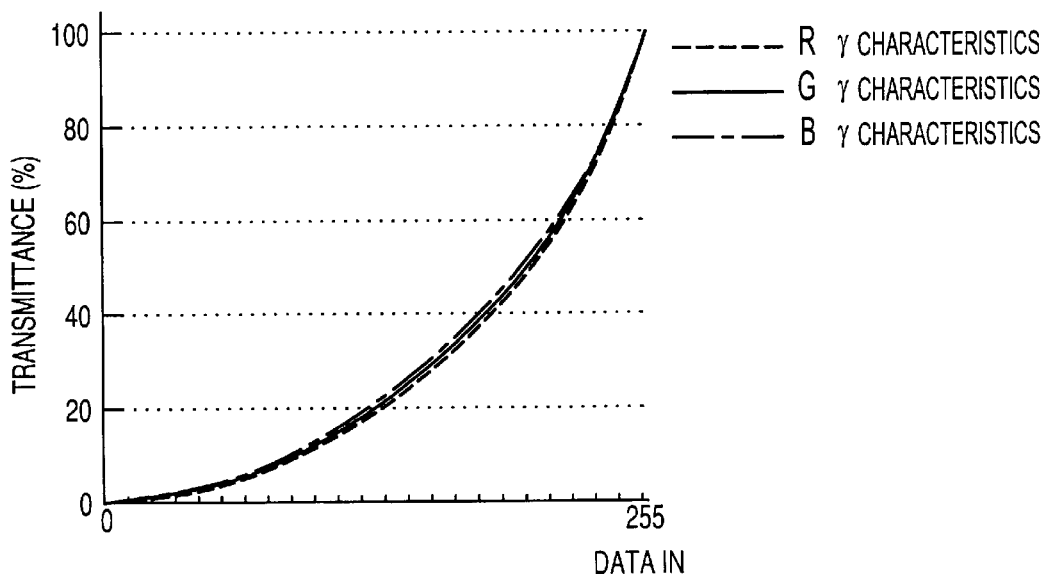
FIG. 19 is an exemplary chart indicating the relationship between gray scale values of the digital picture signal obtained after gamma correction is performed according to the characteristics indicated in FIG. 18 and transmittance ratios.

Moreover, in this embodiment, since amplitude of voltage shown in FIG. 3 compensates for the V-T characteristics within the whole range of 5V, brightness (bias) adjustment and gain adjustment for adjusting the characteristics shown in FIG. 16 to those shown in FIG. 17 are not necessary, although these adjustments are necessary in the conventional art. Thus, this embodiment does not require an arrangement for brightness adjustment and gain adjustment (a variable resistor connected to an amplifier), as clarified by a comparison between FIG. 2 and FIG. 15. In addition, severe brightness adjustment and gain adjustment executed in a factory, which was hitherto necessary at 25 hours per 1000 devices, is not necessary. Furthermore, it is not necessary for the storage section 600 shown in FIG. 1 to store brightness adjustment data and gain adjustment data, in contrast with the conventional art, and it is only required to store gamma correction characteristics shown in FIG. 4 as a conversion table.

In particular, the projection display device has structures shown in FIGS. 1 and 2 for each of the three chromatic lights. In the conventional art, since mutual adjustment of brightness and gain between the liquid crystal devices is performed by using a manual, the workload is quite complicated. In addition, such a conventional device requires a number of component counts, since a variable resistor for adjustment and an adjustment means such as a bias adjustment circuit are provided for each chromatic light. The present invention, however, does not require such a variable resistor for adjustment and a adjustment means, hence, leading to cost reduction.

In addition, conventionally, storing brightness adjustment data and gain adjustment data in the storage unit is necessary, whereas the present invention does not require storing such data, so that the storage area of the storage unit can efficiently be utilized. A conversion table of gamma correction characteristics, as shown in FIG. 4, can be stored in the storage unit. The conversion table has a structure in which a picture signal is input as address data. The data (DATA OUT) corresponding to the picture signal input (DATA IN) is stored in the storage area of the address, and is read out in response to address input so as to convert it into a gamma-corrected digital picture signal.

Furthermore, in the present invention, since the entire operational region is the transmittance ratio of 0% to 100% in the liquid crystal device 400, brightness and contrast of the liquid crystal display screen are improved. Particularly, in the projection display device, when each liquid crystal device can be used in a transmittance range of 0% to 100%, a projected image made of a synthesized light made of chromatic lights can be brighter and also the number of colors for display can be increased.

This embodiment prevents increase in the cost of the D/A converter due to 10-bit output by forming an exclusive IC as a package of ASIC 210 which includes the converter.

Gamma Correction Characteristics Including Color Temperature Correction

Here, a consideration will be given of color temperature control in the projection display device incorporating the liquid crystal device 400 of the above embodiment for respectively modulating each chromatic light of red (R), green (G), and blue (B).

The color temperature of a mixture of R, G, and B, in which the three chromatic lights of R, G, and B are synthesized, is determined by x and y coordinates on a chromaticity diagram of mixtures of lights. Each of the x and y coordinates for R, G, and B are represented by $(X_R, Y_R)$, $(X_G, Y_G)$, and $(X_B, Y_B)$, and the luminance (transmittance ratio) of each color is represented by $Y_R, Y_G$, and $Y_B$, and calculated according to equation (3), as shown below:

$$x = \frac{x_R \frac{Y_R}{y_R} + x_G \frac{Y_G}{y_G} + x_B \frac{Y_B}{y_B}}{\frac{Y_R}{y_R} + \frac{Y_G}{y_G} + \frac{Y_B}{y_B}} \quad y = \frac{Y_R + Y_G + Y_B}{\frac{Y_R}{y_R} + \frac{Y_G}{y_G} + \frac{Y_B}{y_B}} \quad (3)$$

In this case, when the ratio between $Y_R, Y_G$, and $Y_B$ in the common denominator remains constant, so do the values of x and y.

When the aforementioned gamma correction characteristics are calculated, data of x and y coordinates for each single chromatic light of R, G, and B and targeted x and y coordinates are added as parameters and the values of $Y_R$, $Y_G$, and $Y_B$ with respect to input are determined by the respective data based on the aforementioned gamma correction calculation and the equation (3). This permits reproduction of color temperature necessary for all gray scales.

Figure 6:
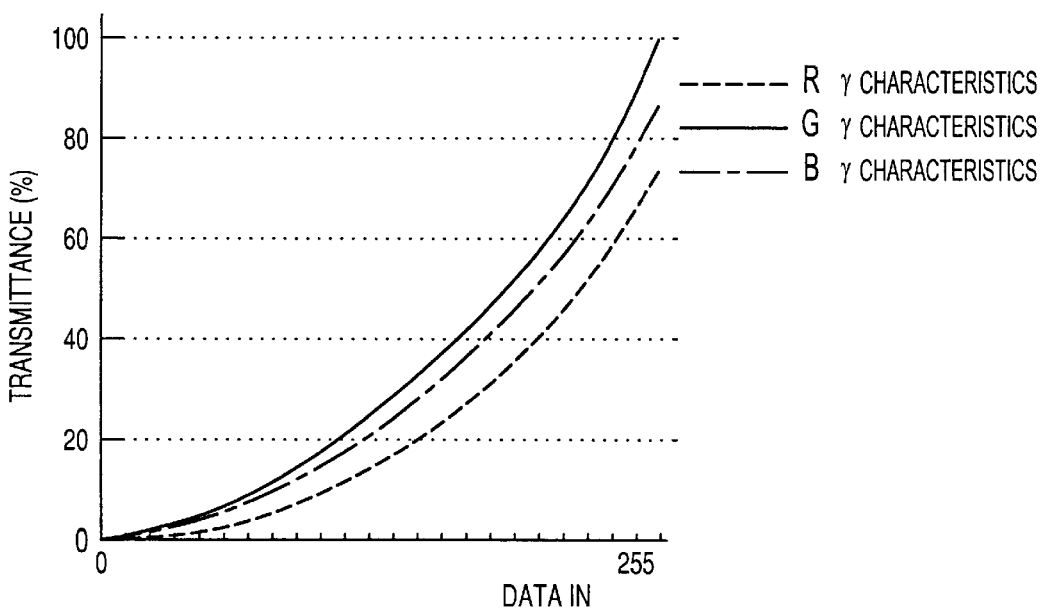
FIG. 6 is an exemplary chart indicating ideal gamma characteristics obtained after a color temperature correction is simultaneously performed along with the gamma correction with respect to the characteristics shown in FIG. 5.

Color temperature adjustment based on the color temperature control is allowed in the following procedure: when the values of x and y coordinates for R, G, and B remains constant, as given above, the color temperature is determined by the mixture ratio of R, G, and B, regardless of values of the luminance. In order to achieve a function for changing color temperature, it is necessary to determine an ideal γ characteristic curve as shown in FIG. 6, which is obtained by multiplying a constant by an ideal γ characteristic curve for gamma correction calculation (see FIG. 3) of one or more of the three liquid crystal devices (light valves), so that the displayed color made of a mixture of R, G, and B has a targeted color temperature (targeted points on the x and y coordinates on the chromaticity diagram). In FIG. 6, each value of G and B is multiplied by a different constant so as to create a deviation between the ideal γ characteristic curves of G and B. Then, a gamma correction calculation can be performed by using the ideal γ characteristic curves adjusted between the respective liquid crystal devices for modulating respective chromatic lights of R, G, and B, as shown in FIG. 6, instead of using the ideal γ characteristic curves shown in FIG. 3, which are used for the calculation of the gamma correction characteristics.

As shown in FIG. 6, when inclinations of V-T characteristic curves of the liquid crystal devices are mutually differentiated, there is a mutual difference between them in transmittance ratios obtained by the process in which a picture signal of the same gray-scale data (DATA IN) is input to the digital gamma correction circuit 220 to perform gamma correction and the picture signal on which gamma correction is performed is supplied to the liquid crystal device 400. Since the modulated chromatic lights of R, G, and B are synthesized and projected, adjustment of inclinations of the V-T characteristic curves can lead to adjustment of color balance. As a result, in the digital gamma correction circuit 220 of the liquid crystal device for each color modulation shown in FIG. 2, adjustment of an inclination of the V-T characteristic curve is performed with respect to each chromatic light so as to perform color temperature correction of an image which is displayed at the same time.

The color temperature correction can be made by performing gamma correction of a digital picture signal in such a manner that the number of bits of the digital picture signal is set to 10 bits for output with respect to 8 bits for input and the increase in the number of bits, which means increase in resolution, permits precise correction of V-T characteristic curves in the transmittance range of 0% to 100% so as to allow a fine setting of inclinations of the characteristic curves as shown in FIG. 6.

Operation of Signal Processing Circuit After Gamma Correction

A description will be given of signal processing performed by the liquid crystal device.

Figure 7:
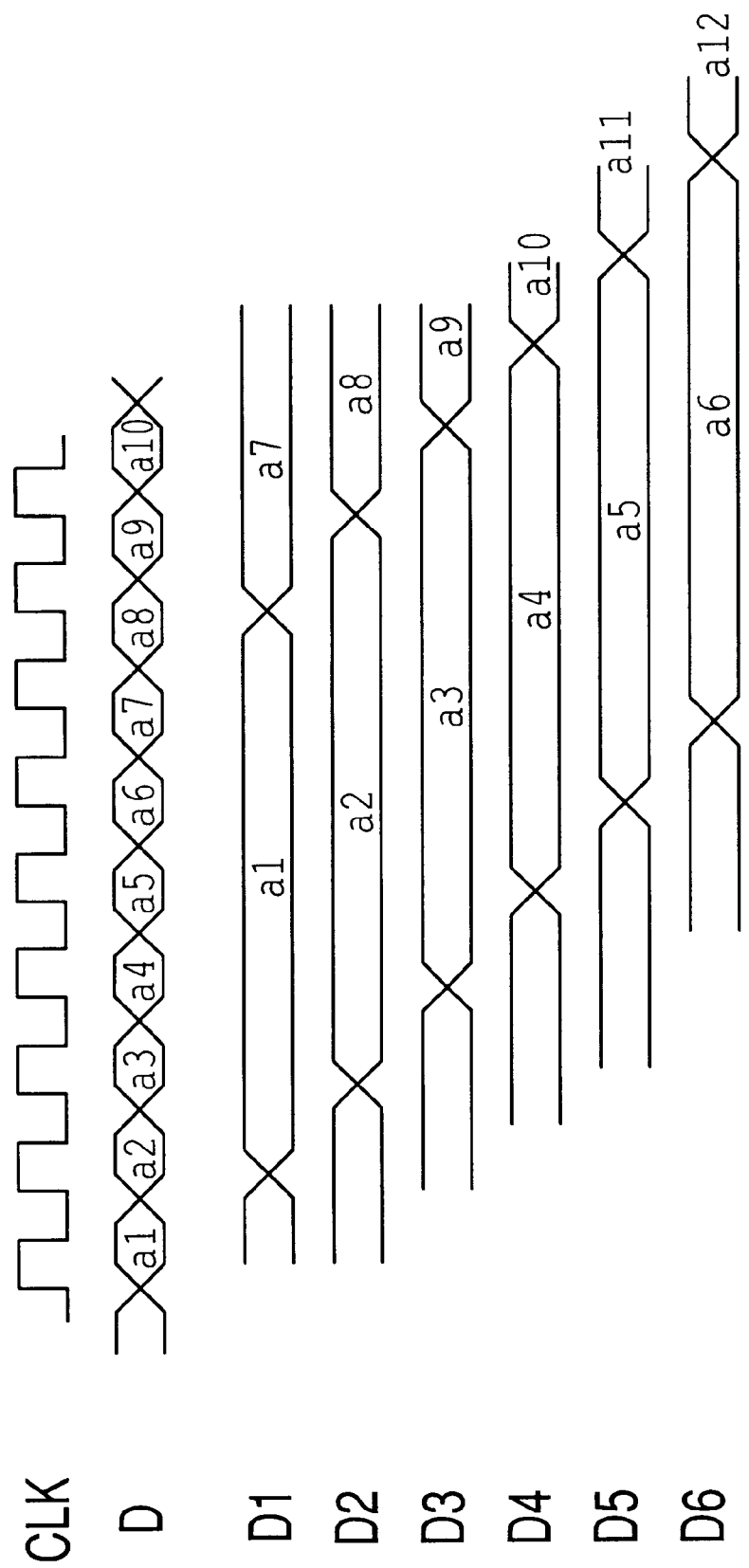
FIG. 7 is a schematic view illustrating phase expansion (parallel-serial conversion)

As shown in FIG. 7, in the phase-expansion circuit 230 shown in FIG. 2, phase expansion (serial-parallel conversion) of a 10-bit serial digital picture signal subjected to gamma correction is executed to obtain parallel digital picture signals D1 through D6. A description will be provided of the phase expansion referring to FIG. 7.

As schematically shown in FIG. 7, the 10-bit serial picture signal data D has, for example, serial picture signal data D1, D2, . . . , which is transmitted according to a reference clock CLK of 40 MHz. The picture signal data D1, D2, . . . , is 10-bit data respectively representing gray scale levels of each pixel. In the phase expansion circuit, the picture signal data D1, D2, . . . , is expanded in such a manner that their data cycle amounts to 6 times as many as the initial D by a shift register and a latch circuit and the phase-expanded 10-bit picture signal data D1 through D6 is output in a parallel mode.

Figure 14:
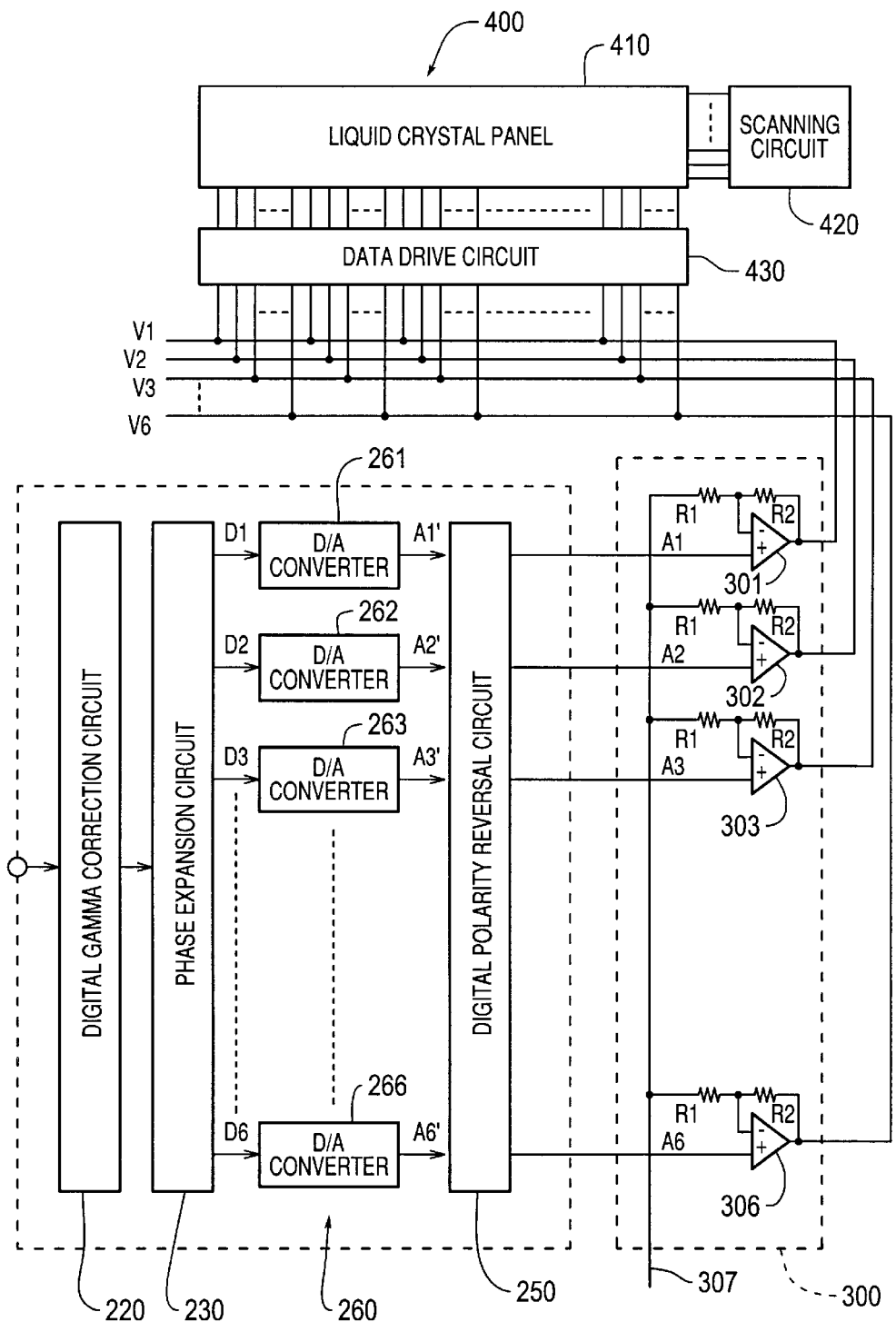
FIG. 14 is a block diagram of the liquid crystal display device employing an analog polarity inverting circuit.

A method shown in FIG. 14 is referred to as a six-phased expansion and used for SVGA with low pixel density, in which frequency for writing is 6.7 MHz. In the case of XGA with high pixel density, 12-phase expansion is employed and frequency for writing is 5.4 MHz.

Figure 8A:
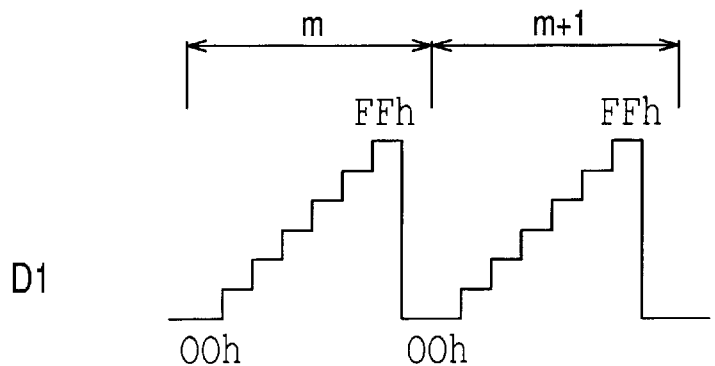
FIGS. 8(A) to (C) are schematic views illustrating a phase-expanded digital picture signal, a polarity-inverted signal, and an amplified analog picture signal.
Figure 8B:
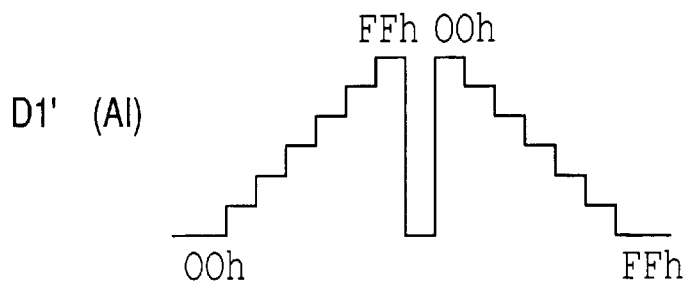
Figure 8C:
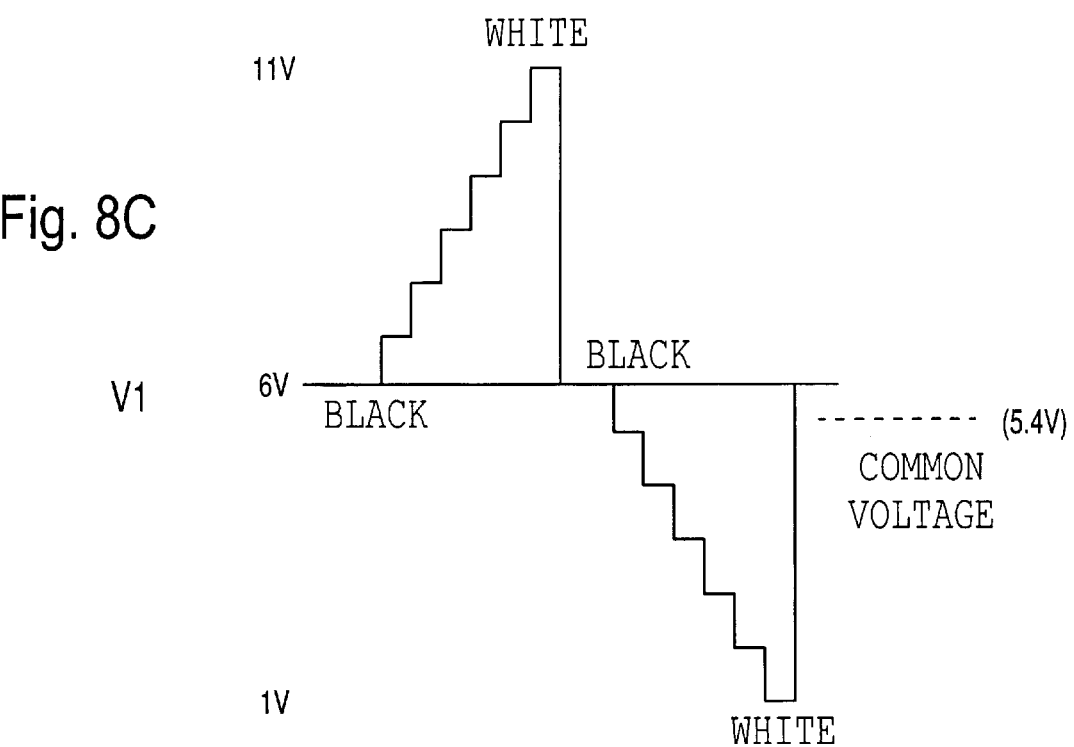

Referring now to FIGS. 8(A) to (C), each operation relating to polarity inversion, D/A conversion, and amplification will be described below.

FIG. 8(A) schematically shows a digital picture signal D1 as an example, a signal is presented in such a manner that the gray scale values of the signal change in phases from 00 h to FFh in hexadecimal notation in each horizontal scanning period. FIG. 8(A) illustrates the gray scale values in an analog form for convenience of description.

The digital picture signal D1 shown in FIG. 8(A) is digitally inverted its polarity in the polarity inverting circuit 240. In this case, polarity of the digital picture signal D1 is inverted in each horizontal scanning period. In addition, polarities of digital picture signals D2 through D6, which are not shown, are also inverted in each horizontal scanning period. Consequently, the liquid crystal pixel unit 410 of the liquid crystal device 400 performs a line inverting drive, in which polarity of voltage applied to the liquid crystal of a pixel is inverted in each horizontal scanning period (on every scanning line).

FIG. 8(B) shows a signal D1' obtained by digitally inverting the polarity of the digital picture signal D1 in each horizontal scanning period. In FIG. 8(B), the polarity of a signal in the $m^{th}$ horizontal scanning period is not inverted, whereas the polarity of a signal in the $(m+1)^{th}$ horizontal scanning period is inverted.

The term "polarity" here is a direction of an electrical field applied to the liquid crystal between a pixel electrode and a common electrode in a pixel of the liquid crystal unit 410. To reverse the polarity of a signal means to change a signal phase so that a direction of the electrical field applied to liquid crystal of a pixel is inverted.

There are provided two methods for digital-polarity inversion as examples. One of the methods is to reverse a logic of digital values, namely, for instance, it is to change 2-bit data (1, 1) into (0, 0). The other method is to assume two's-complement numbers of digital values, which are binary numbers, for example, 2-bit data (1, 1) is changed into (0, 1). With these methods, the digital picture signal D1 shown in FIG. 8(A) is converted into the digital picture signal D1' shown in FIG. 8(B).

When the liquid crystal pixel unit 410 adopts an active matrix driving method and the switching element is composed of a thin film transistor, the polarity of voltage applied to liquid crystal is inverted based on the potential of an opposite (common) electrode. When the switching element is composed of a thin film diode (metal-insulator-metal), the polarity of voltage applied to the liquid crystal is inverted based on the medium potential of amplitude of an analog picture signal which is output from the amplifiers 301 through 306.

The D/A converter 261, shown in FIG. 2, performs digital-to-analog conversion of the input digital picture signal D1' schematically shown in FIG. 8(B) for output. An analog signal A1 output from the D/A converter 261 can be regarded as substantially the same one as the digital picture signal D1' schematically shown in FIG. 8(B). In addition, a picture signal shown in FIG. 8(B), in which the signal phase is inverted in each horizontal scanning period is similarly obtained in the D/A converters 262 through 266. Regarding an analog picture signal output from the D/A converters 261 through 266, even though the signal phase is inverted in each horizontal scanning period, the maximum amplitude and the minimum amplitude of the analog picture signal remain constant in-any of these converters.

After the analog signal A1, the amplitude of which has been modulated, is input into a positive terminal, and then a bias signal 307, the potential level of which is inverted in each horizontal scanning period, is input into a negative terminal, the operational amplifier 301 shown in FIG. 2 outputs a signal V1 amplified according to the equation (1). FIG. 8(C) shows the signal V1. The bias signal 307, in the case of polarity inversion driving of the liquid crystal, serves as a standard signal for amplification performed centering on a standard potential, as shown in FIG. 8(C).

In FIG. 8(C), for example, when the liquid crystal device 400 is in the normally black mode, regarding the signal V1, the white level is 1V and the black level is 6V in the case of driving in a first polarity (positive polarity) in the mth horizontal scanning period. The white level is 11v and the black level is 6V in the case of driving in a second polarity (negative polarity) in the (m+1)th horizontal scanning period. When driving in a first polarity and a second polarity are performed, both of the voltage amplitudes are 5V and this coincides with the voltage amplitude of 5V given at the full scale of the horizontal axis shown in FIG. 3.

In order to respectively achieve the black level (transmittance ratio of 0%) in the cases of driving in a first polarity and a second polarity, the voltage output from the amplifier is 6V in both cases. The embodiment of the present invention adopts a larger voltage amplitude (5V) than voltage amplitude (approximately 3.8V) in a conventional art. The common potential for the black level in both cases of driving in a first polarity and a second polarity is set to 6V, as described above, so that the total voltage amplitude in driving in a first polarity and second polarity can be limited to 10V (1V to 11V), which is the minimum amplitude.

In the case of a normally black mode, in order to respectively achieve a black level (transmittance ratio 0%) in driving in both of a first polarity and a second polarity, the voltage output from the amplifier is 6V in both cases.

The V-T characteristics in the embodiment of the present invention are described based on the premise that a normally black mode is adopted for the liquid crystal device 400. When a normally white mode is adopted for the same, the only difference between the cases is a inverted relationship between the voltage and the transmittance, therefore, the case of normally white mode can be considered the same as that of normally black mode.

As is clearly seen from a comparison between FIG. 1 and FIG. 15, gain adjustment of the amplifier is not necessary in this embodiment. In addition, since a error of gain of the operational amplifiers 301 through 306 are limited to the minimum, there in no need for adjustment.

As clearly shown in the aforementioned equation (1), gain with respect to the analog signal A1 is (1+R2/R1), and gain with respect to the bias signal 307 is (R2/R1). Therefore, it is found that gain of the operational amplifier 301 depends only on a resistance ratio (R2/R1), regardless of absolute values of the resistance values R2 and R1. Accordingly, when the resistance ratios (R2/R1) in the operational amplifiers 301 through 306 remain constant, so do gains of the operational amplifiers 301 through 306.

For this embodiment, the resistance ratios (R2/R1) in the respective operational amplifiers 301 through 306 are allowed to be constant and the resistance values R2 and R1 are allowed not to be variable but to be fixed.

For this arrangement, a pair of the resistance values R2 and R1 are formed, for example, by using the same thin film manufacturing process on the same substrate. This allows each resistance layer for maintaining the resistance values R2 and R1 to be formed of the same material and with substantially the same thickness. Furthermore, this permits the width and the length of the pair to be maintained with high precision depending on mask precision. Consequently, this enhances precision of the resistance ratio of R2 and R1. Accordingly, the resistance ratio (R2/R1) of resistors for setting gain of each pair, which are connected to respective operational amplifiers 301 through 306, can be substantially equal.

It is possible for the thin film manufacturing process of a gain setting resistor to use a technology which has been established in a semiconductor manufacturing process. For instance, a polysilicon layer is formed on a substrate having at least an insulated surface and is ion-doped so as to form a resistance layer. Then, the procedure of lithography, resist coating, exposure, development, and etching for patterning, can be performed to manufacture a resistor having high precision in resistance ratios (R2/R1).

As mentioned above, since this embodiment also does not require brightness adjustment, it is not required that a bias potential of the bias signal 307 for polarity inversion be adjusted in various ways.

Modifications of Polarity Inverting Circuit

The liquid crystal display device shown in FIG. 14 has an analog polarity inverting circuit 250 as a substitute for the digital polarity inverting circuit 240 shown in FIG. 2. The other structural parts of the device are the same as the structural parts of the one employed in the embodiment described above.

In this case, signals A1' through A6' output from the D/A converters 261 through 266 are analog picture signals before polarity inversion. The analog polarity inverting circuit 250, to which analog picture signals A1' through A6' are input, outputs analog picture signals A1 through A6, the polarities of which are inverted with respect to a certain standard potential in a specified period.

The analog picture signals A1 through A6 are the same as those schematically shown in FIG. 8(C). Thus, the present invention permits both analog polarity inversion and digital polarity inversion.

Furthermore, although the above embodiment executes phase expansion of a digital signal, it is also possible to execute phase expansion of an analog signal after D/A conversion.

Description of Electronic Equipment

An electronic equipment incorporating the liquid crystal device described above comprises a display information output source 1000, a display information processing circuit 1002, a display driving circuit 1004, a display panel 1006 of a liquid crystal device or the like, a clock generation circuit 1008, and a power supply circuit 1010. The display information output source 1000 comprises memory such as ROM, RAM, a tuning circuit for tuning a television signal for output, and the like and outputs display information including a picture signal based on a clock from the clock generation circuit 1008. The display information processing circuit 1002 performs processing of display information for output based on the clock from the clock generation circuit 1008. The display information processing circuit 1002 is generically referred to as an inclusion of the A/D converter 100, the picture signal processing circuit 200, and the amplifier 300 shown in FIG. 1. The display driving circuit 1004 comprises the scanning circuit 420 and the data driving circuit 430 shown in FIG. 2 and performs display drive of the liquid crystal panel 1006. The power supply circuit 1010 supplies power to each circuit described above.

Figure 10:
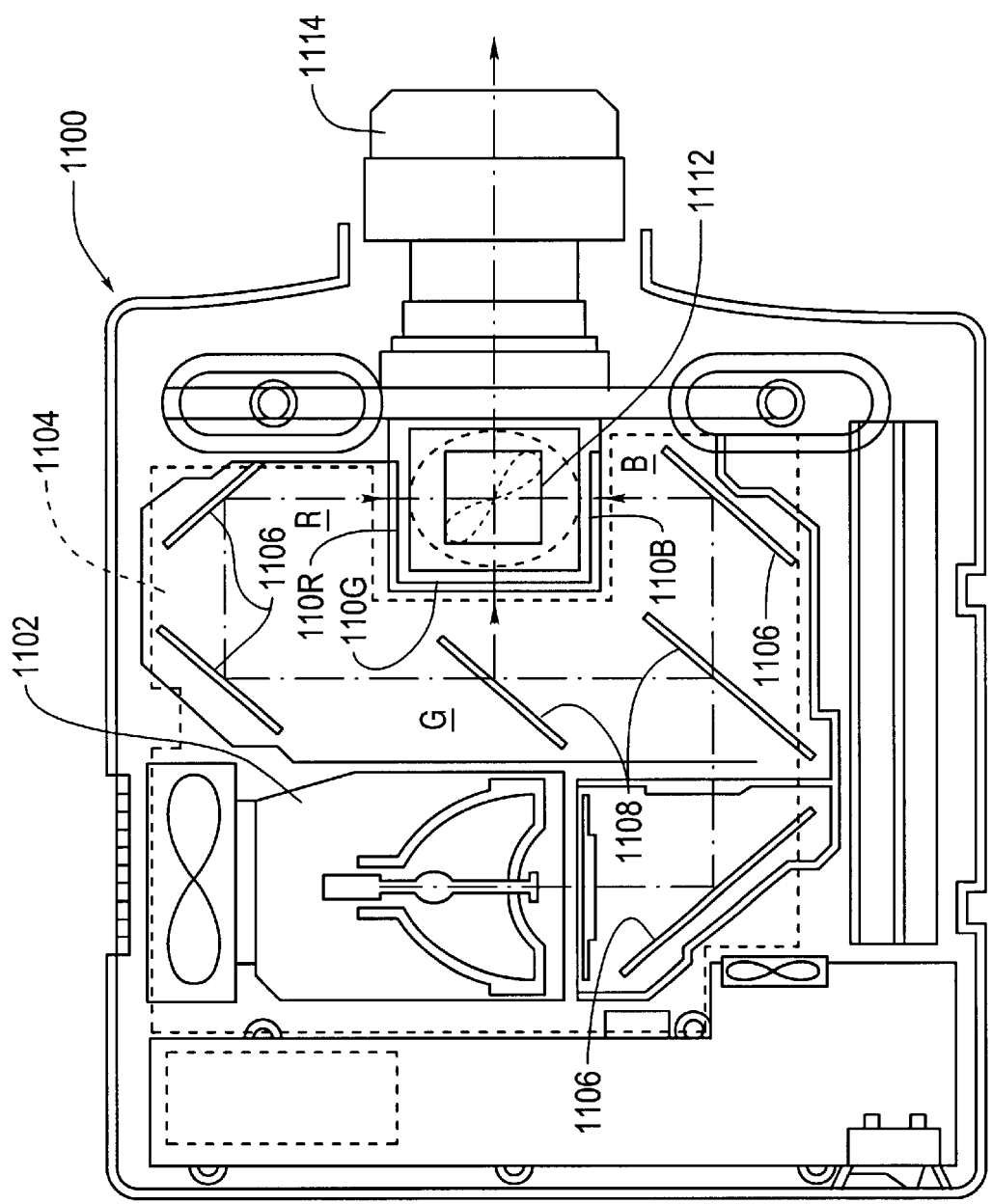
FIG. 10 is a schematic view of a projection display device used as an example of electronic equipment in accordance with the present invention.
Figure 11:
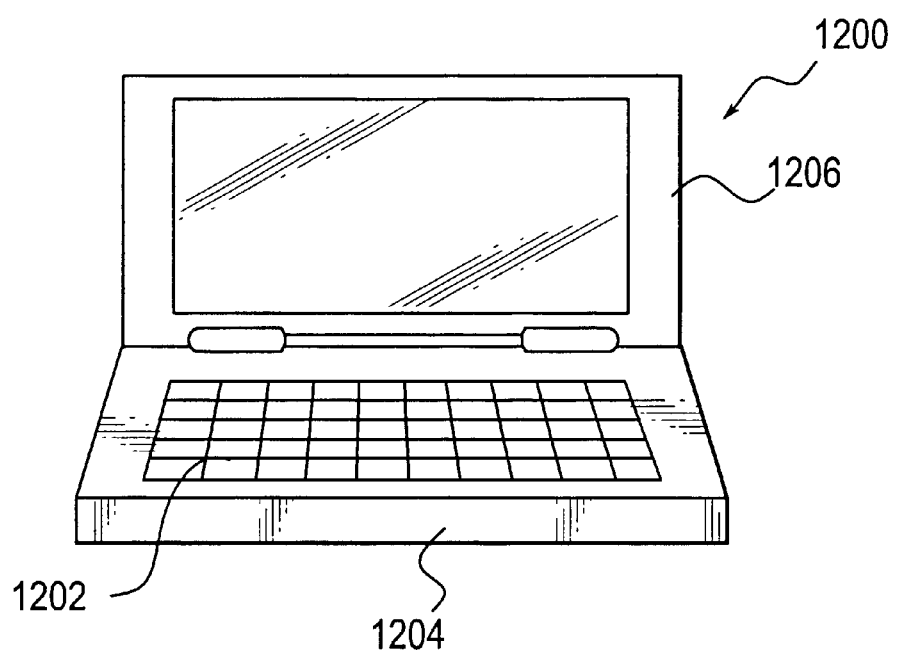
FIG. 11 is a schematic perspective view of a personal computer used as an example of the electronic equipment in accordance with the present invention.
Figure 12:
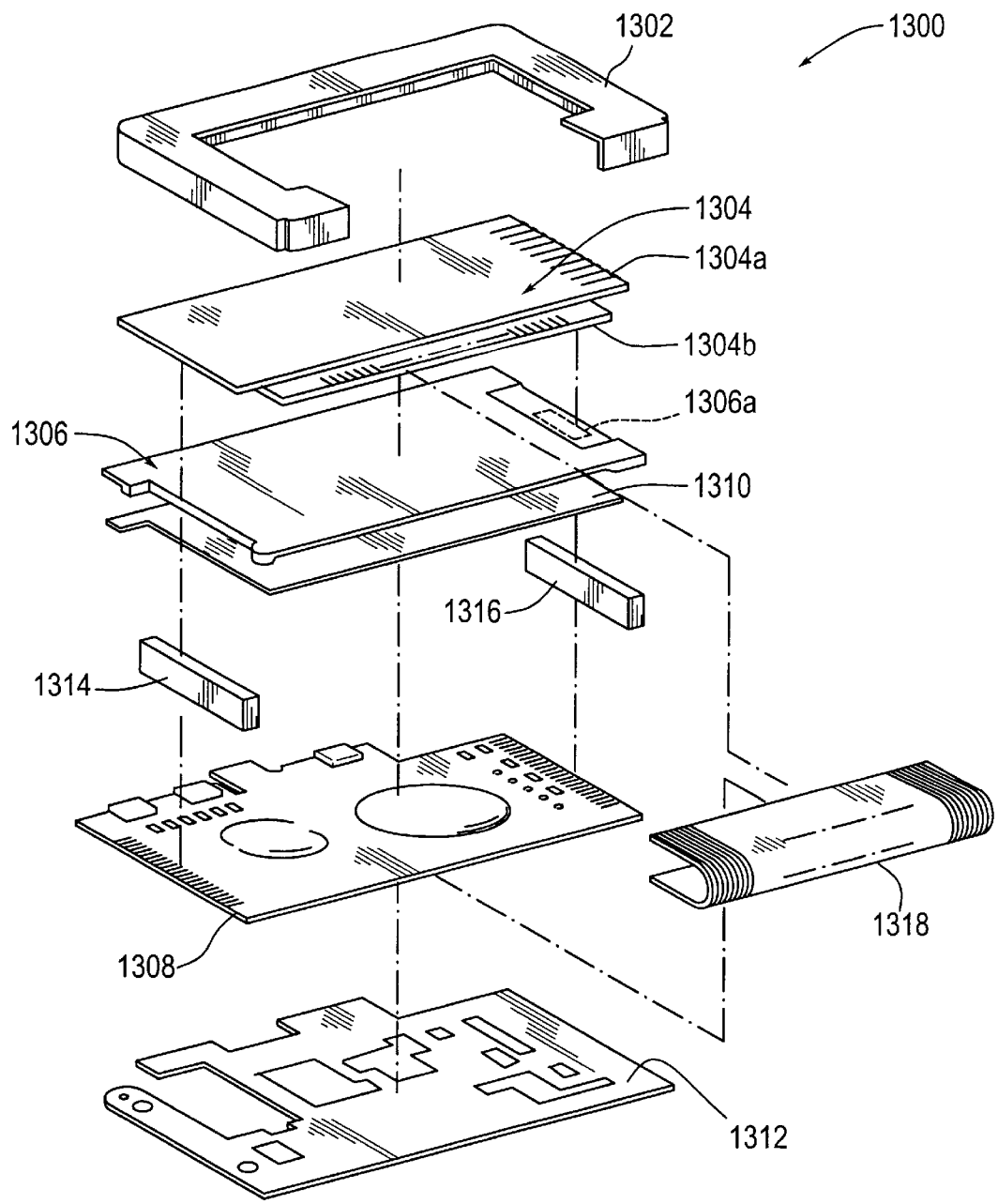
FIG. 12 is an exploded perspective view of a pager used as an example of the electronic equipment in accordance with the present invention.

Examples of electronic equipment having such a structure are a liquid crystal projection display device shown in FIG. 10, a multimedia-capable personal computer shown in FIG. 11, an engineering work station (EWS), a pager shown in FIG. 12, a mobile phone, a word processor, a television set, a view-finder or monitor direct viewing type video tape recorder, an electronic notebook, an electric portable calculator, a car navigation system, POS terminal, an apparatus equipped with a touch panel and the like.

The projection display device shown in FIG. 10 employs a transmissive liquid crystal device as a light valve in which, for example, a prism-synthesized optical system is used. In the projection display device 1100 shown in FIG. 10, projection light from a lamp unit 1102 of a white light source is divided into three basic colors of R, G, and B by a plurality of mirrors 1106 and two dichroic mirrors 1108 inside a light guide 1104 so as to be led into three liquid crystal devices 1110R, 1110G, and 1110B for displaying an image made from each color. Each of the liquid crystal devices has a circuit block as shown in FIGS. 1 and 2 given above. Respective lights modulated by the liquid crystal devices 1110R, 1110G, and 1110B are entered into the dichroic prism 1112 from three directions. In the dichroic prism 1112, a red light (R) and a blue light (B) make a rectangular turn, whereas a green light (G) travels straight and then, images made of each chromatic light are synthesized to project a color image on a screen or the like through a projection lens 1114.

The personal computer 1200 shown in FIG. 11 comprises a main body 1204 equipped with a key board 1202, and a liquid crystal display screen 1206.

A pager 1300, shown in FIG. 12, contains a liquid crystal panel substrate 1304, a light guide 1306 equipped with a back light 1306a, a circuit board 1308, a first shielding plate 1310, a second shielding plate 1312, two elastic-conductive materials 1314 and 1316, and a film carrier tape 1318 in a metallic frame 1302. The two elastic-conductive materials 1314 and 1316, and a film carrier tape 1318 are used for connecting the liquid crystal panel substrate 1304 and the circuit board 1308.

Figure 9:
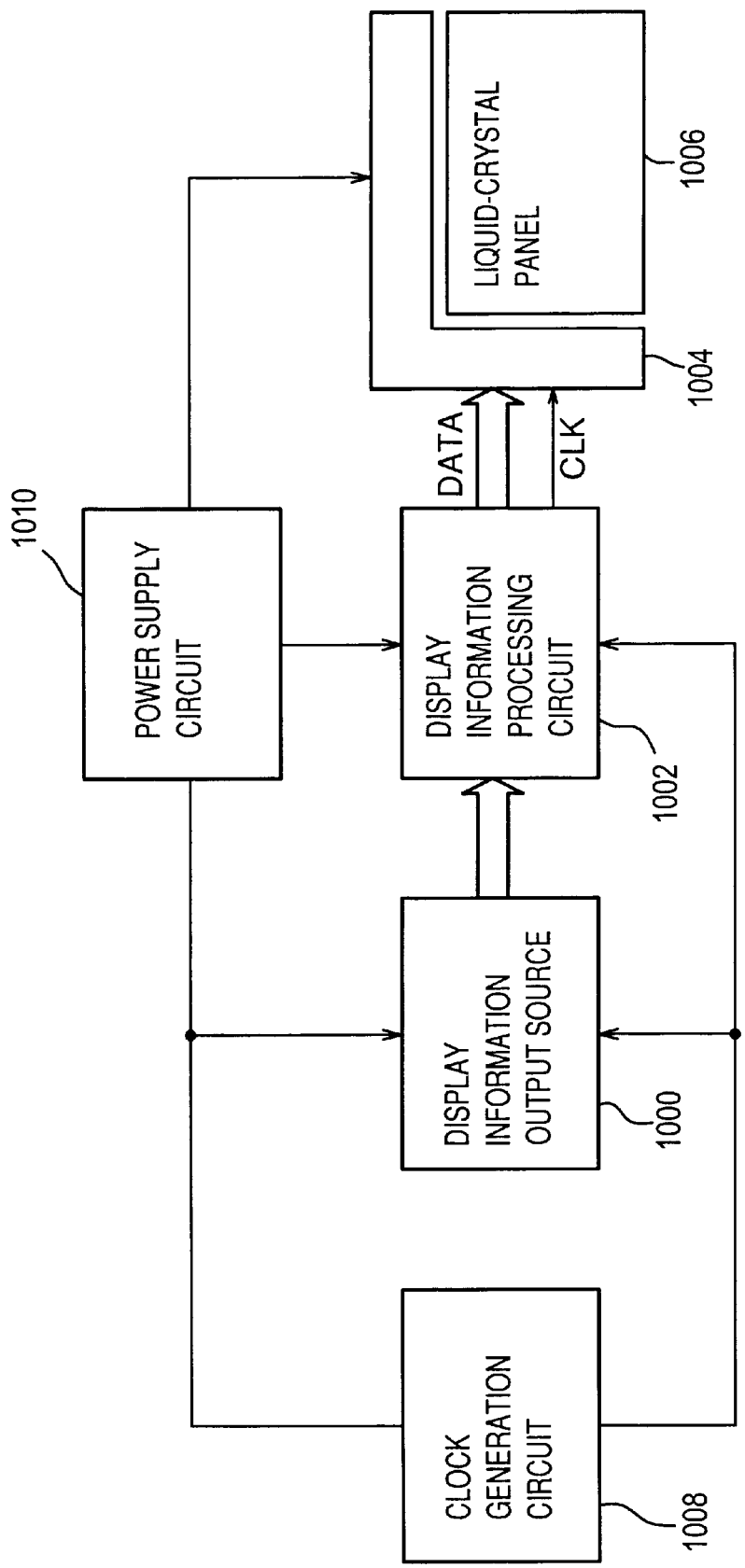
FIG. 9 is a block diagram of a liquid crystal display device used as an example of an electro-optical device in accordance with the present invention.

In this figure, the liquid crystal panel substrate 1304 is formed by having liquid crystal sealed between two transparent substrates 1304a and 1304b, and this permits at least formation of a dot-matrix liquid crystal device. It is possible to form the driving circuit 1004 shown in FIG. 9, or in addition to this, the display information processing circuit 1002 on one of the transparent substrates. A circuit which cannot be mounted on the liquid crystal panel substrate 1304 can be an external circuit of the liquid crystal panel substrate so as to be mounted on the circuit board 1308 in the case of FIG. 12.

Figure 13:
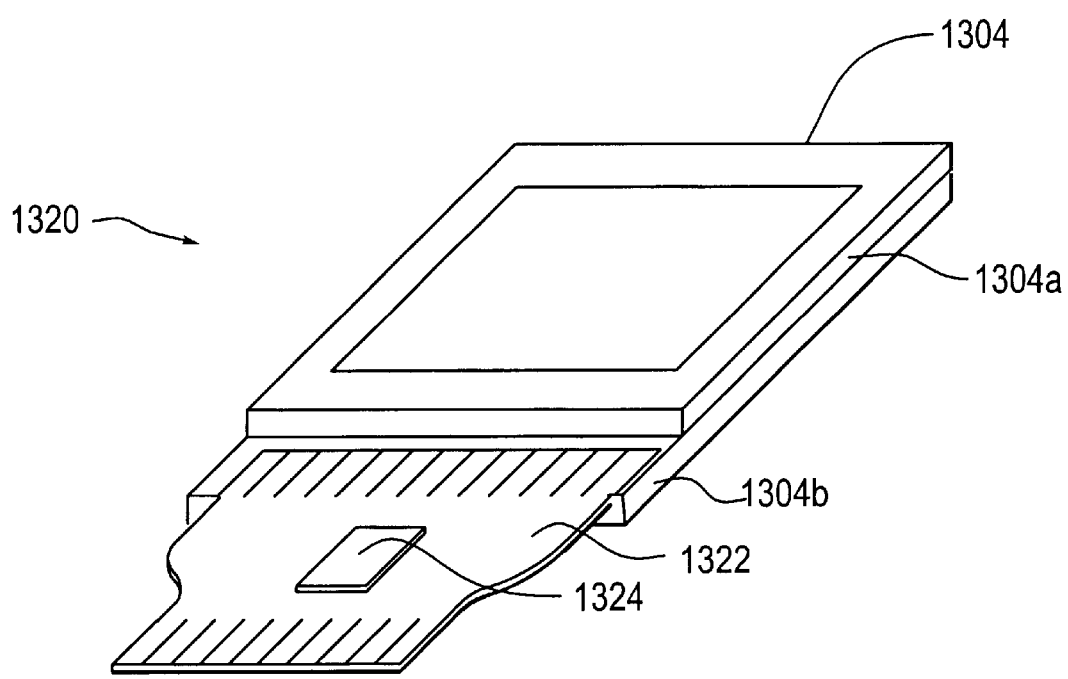
FIG. 13 is a schematic perspective view of TCP incorporating a picture signal processing circuit.

Since FIG. 12 shows a structure of the pager, the circuit board 1308 is required in addition to the liquid crystal panel substrate 1304 in which the liquid crystal display device is used as one of the components for the electronic equipment. In the case in which a display driving circuitry is mounted on the transparent substrate, the minimum unit of the liquid crystal display device is the liquid crystal panel substrate 1304. Alternatively, it is possible to use the liquid crystal panel substrate 1304 fixed into the metallic frame 1302, which is a housing, as the liquid crystal display device, which is one of the components for electronic equipment. Furthermore, in the back-lighting form, the liquid crystal panel substrate 1304 and a light guide 1306 equipped with the back light 1306a are incorporated into the metallic frame 1302 to form a liquid crystal display device. As substitutes for these components, as shown in FIG. 13, a tape carrier package (TCP) 1320 in which an IC chip 1324 is mounted on a polyimide tape 1322 having a metallic conductive film formed thereon can be connected to one of the two transparent substrates 1304a and 1304b forming the liquid crystal panel substrate 1304 so as to be used as a liquid crystal display device which is one of the components for electronic equipment.

As described above, the liquid crystal device provided as an example of the electro-optical device employed in the embodiment of the present invention can be applied as a liquid crystal display device or a light valve in use for various kinds of electronic equipment.

However, the present invention should not be construed to be limited to the above embodiment and various modifications are possible within the scope of the present invention. For instance, the electro-optical device provided by the present invention is not limited to the above-described liquid crystal device, but is also applicable to various kinds of electro-optical devices such as an EL display, a plasma display, and an FED.

What is claimed is:

1. A display device, comprising:
    an electro-optical device in which light transmittance changes based on voltage applied to an electro-optical material;
    a digital gamma correction circuit that performs gamma correction of a digital picture signal, including gamma correction for ranges outside a near-black level, and converting the digital picture signal of n bits into a digital picture signal of N bits (N≧n+2) based on gamma correction characteristics predetermined by applied voltage-transmittance characteristics inherent in the electro-optical device;
    a digital-to-analog conversion circuit that converts the digital picture signal corrected by the digital gamma correction circuit into an analog picture signal; and
    an amplifier that amplifies the analog picture signal, the voltage being applied to the electro-optical material based on the output of the amplifier.

2. The display device according to claim 1, the gamma correction characteristics of the digital gamma correction circuit being predetermined by applied voltage-transmittance characteristics inherent in the electro-optical device in the entire transmittance range of 0% through 100%.

3. The display device according to claim 1, the digital gamma correction circuit performing at least one of a bias adjustment and a gain adjustment of the picture signal applied to the electro-optical material so as to perform conversion of the digital picture signal.

4. The display device according to claim 3, the amplifier not including a variable resistor for adjusting a bias and adjusting a gain of the picture signal.

5. The display device according to claim 1, the amplifier outputting the picture signal to perform polarity inversion of the voltage applied to the electro-optical material at a specified cycle, further comprising a digital polarity inverting circuit that performs polarity inversion of the digital picture signal output from the digital gamma correction circuit in a digital form at the specified cycle.

6. The display device according to claim 1, the amplifier outputting a picture signal to perform polarity inversion of voltage applied to the electro-optical material at a specified cycle, further comprising an analog polarity inverting circuit that performs polarity inversion of the analog picture signal output from the digital-to-analog converter in an analog form at the specified cycle.

7. The display device according to claim 5, a voltage of a first polarity and a second polarity being applied to the electro-optical material at the specified cycle, and a voltage output from the amplifier in achieving one of the maximum transmittance and the minimum transmittance in the electro-optical device being substantially equal when voltage application is performed in the first polarity and the second polarity.

8. A gamma correction method for correcting applied voltage-transmittance characteristics inherent in an electro-optical device in which light transmittance changes based on voltage applied to an electro-optical material, comprising:
    performing gamma correction of a digital picture signal of n bits, including gamma correction for ranges outside a near-black level, and converting the digital picture signal of n bits into a digital picture signal of N bits (N≧n+2) based on gamma correction characteristics predetermined by applied voltage-transmittance characteristics inherent in the electro-optical device;
    converting the digital picture signal subjected to gamma correction into an analog picture signal;
    amplifying the analog picture signal; and
    applying voltage to the electro-optical material based on the amplified analog picture signal.

9. The gamma correction method according to claim 8, further comprising performing a bias adjustment and a gain adjustment of a picture signal applied to the electro-optical material and performing conversion of the digital picture signal when the gamma correction is performed.

10. Electronic equipment comprising the display device according to claim 1.

11. Electronic equipment having a plurality of electro-optical devices in which light transmittance changes based on voltage applied to an electro-optical material and chromatic lights modulated by the plurality of electro-optical devices are synthesized to form a display, each of the electro-optical devices comprising:
    a digital gamma correction circuit that performs gamma correction of a digital picture signal, including gamma correction for ranges outside a near-black level, and converting the digital picture signal of n bits into a digital picture signal of N bits (N≧n+2) based on gamma correction characteristics predetermined by applied voltage-transmittance characteristics inherent in each of the electro-optical devices;
    a digital-to-analog conversion circuit that converts the digital picture signal corrected by the digital gamma correction circuit into an analog picture signal; and
    an amplifier that amplifies the analog picture signal, the voltage being applied to the electro-optical material based on the output of the amplifier.

12. The electronic equipment according to claim 11, the digital gamma correction circuit performing conversion into a digital picture signal in such a manner that the gray-scale data and the corresponding transmittance characteristic curves of the electro-optical devices are substantially equal between the plurality of electro-optical devices.

13. The electronic equipment according to claim 11, the digital gamma correction circuit of the each of the electro-optical devices performing at least one of a bias adjustment and a gain adjustment of a picture signal applied to the each of the electro-optical devices to convert the picture signal into the digital picture signal.

14. The electronic equipment according to claim 13, the amplifier not including a variable resistor to adjust a bias and adjust a gain of the picture signal.

15. The electronic equipment according to claim 11, a plurality of the electro-optical devices respectively modulating mutually different chromatic lights, and the digital gamma correction circuit corresponding with each of the plurality of electro-optical devices performing correction of color temperature indicated by a synthesized light made of chromatic lights modulated by each of the electro-optical devices.

16. The electronic equipment according to claim 15, the digital gamma correction circuit corresponding to each of the plurality of electro-optical devices adjusting inclinations of the transmittance characteristic curves of the electro-optical devices corresponding to gray-scale data between the electro-optical devices so as to perform color temperature correction.

17. The display device according to claim 6, a voltage of a first polarity and a second polarity being applied to the electro-optical material at the specified cycle, and a voltage output from the amplifier in achieving one of the maximum transmittance and the minimum transmittance in the electro-optical device being substantially equal when voltage application is performed in the first polarity and the second polarity.

* * * * *